(12) United States Patent
Peterson et al.

(10) Patent No.: US 10,381,176 B2
(45) Date of Patent: Aug. 13, 2019

(54) KEYBOARD BACKLIGHTING WITH DEPOSITED LIGHT-GENERATING SOURCES

(71) Applicant: Rohinni, LLC, Coeur d'Alene, ID (US)

(72) Inventors: Cody Peterson, Hayden, ID (US); Andrew Huska, Liberty Lake, WA (US); Kasey Christie, Austin, TX (US); Clinton Adams, Coeur d' Alene, ID (US)

(73) Assignee: Rohinni, LLC, Coeur d'Alene, ID (US)

( * ) Notice: Subject to any disclaimer, the term of this patent is extended or adjusted under 35 U.S.C. 154(b) by 0 days.

(21) Appl. No.: 14/507,713

(22) Filed: Oct. 6, 2014

(65) Prior Publication Data

US 2015/0138096 A1 May 21, 2015

Related U.S. Application Data

(63) Continuation of application No. PCT/US2014/042018, filed on Jun. 11, 2014.
(Continued)

(51) Int. Cl.
| | |
|---|---|
| *G06F 1/16* | (2006.01) |
| *G06F 3/02* | (2006.01) |
| *H01H 3/12* | (2006.01) |
| *H01H 13/83* | (2006.01) |
| *H01H 13/88* | (2006.01) |

(Continued)

(52) U.S. Cl.
CPC ........... *H01H 13/83* (2013.01); *G02B 6/0068* (2013.01); *G02B 6/0073* (2013.01); *G06F 1/1662* (2013.01); *G06F 3/0202* (2013.01); *H01H 11/00* (2013.01); *H01H 13/88* (2013.01); *H01H 3/125* (2013.01); *H01H 2219/016* (2013.01); *H01H 2219/037* (2013.01); *H01H 2219/044* (2013.01); *H01H 2219/048* (2013.01); *H01H 2219/056* (2013.01); *H01H 2219/062* (2013.01);
(Continued)

(58) Field of Classification Search
CPC .... G06F 3/0202; G06F 1/1662; G06F 3/0308; G02B 6/0068; G02B 6/0073; H01H 13/83; H01H 13/88; H01H 11/00; H01H 2229/002; H01H 2219/048; H01H 2219/056; H01H 2219/037; H01H 2219/016; H01H 2219/062; H01H 2219/044; H01H 3/125; Y10T 29/49105
See application file for complete search history.

(56) References Cited

U.S. PATENT DOCUMENTS

| | | |
|---|---|---|
| 2,344,136 A | 3/1944 | Dressen |
| 3,717,743 A | 2/1973 | Costello |

(Continued)

FOREIGN PATENT DOCUMENTS

| | | |
|---|---|---|
| CN | 203055745 U | 7/2013 |
| EP | 1628459 | 2/2006 |

(Continued)

OTHER PUBLICATIONS

"Innovate Keypad Design With Light Guides and LEDs," Nov. 17, 2009, Avago Technologies, pp. 1-14.
(Continued)

*Primary Examiner* — Brent D Castiaux
(74) *Attorney, Agent, or Firm* — Lee & Hayes, P.C.

(57) ABSTRACT

Techniques and devices provide backlighting for keys of a keyboard or keypad.

19 Claims, 13 Drawing Sheets

Related U.S. Application Data

(60) Provisional application No. 61/834,406, filed on Jun. 12, 2013, provisional application No. 61/834,418, filed on Jun. 12, 2013, provisional application No. 61/834,669, filed on Jun. 13, 2013, provisional application No. 61/835,504, filed on Jun. 14, 2013, provisional application No. 61/836,086, filed on Jun. 17, 2013, provisional application No. 61/836,632, filed on Jun. 18, 2013, provisional application No. 61/837,132, filed on Jun. 19, 2013, provisional application No. 61/894,824, filed on Oct. 23, 2013, provisional application No. 61/903,396, filed on Nov. 13, 2013, provisional application No. 61/909,290, filed on Nov. 26, 2013.

(51) Int. Cl.
*H01H 11/00* (2006.01)
*F21V 8/00* (2006.01)

(52) U.S. Cl.
CPC .. *H01H 2229/002* (2013.01); *Y10T 29/49105* (2015.01)

(56) References Cited

U.S. PATENT DOCUMENTS

| | | | |
|---|---|---|---|
| D235,788 S | 7/1975 | Eberhardt | |
| 3,935,986 A | 2/1976 | Lattari et al. | |
| 4,060,185 A | 11/1977 | Kuroda | |
| 4,093,973 A | 6/1978 | Vaagenes | |
| 4,997,196 A | 3/1991 | Wood | |
| 5,110,752 A | 5/1992 | Lu | |
| 5,131,582 A | 7/1992 | Kaplan et al. | |
| D334,543 S | 4/1993 | Falcone | |
| 5,266,514 A | 11/1993 | Tuan et al. | |
| 5,378,926 A | 1/1995 | Chi et al. | |
| 5,408,060 A | 4/1995 | Muurinen | |
| 5,426,558 A | 6/1995 | Sherman | |
| 5,435,857 A | 7/1995 | Han et al. | |
| 5,442,254 A | 8/1995 | Jaskie | |
| 5,493,470 A | 2/1996 | Zavracky et al. | |
| 5,592,358 A | 1/1997 | Shamouilian et al. | |
| 5,640,133 A | 6/1997 | MacDonald et al. | |
| 5,740,956 A | 4/1998 | Seo et al. | |
| 5,745,331 A | 4/1998 | Shamouilian et al. | |
| D394,391 S | 5/1998 | Bruce et al. | |
| 5,746,493 A | 5/1998 | Jonsson et al. | |
| 5,771,253 A | 6/1998 | Chang-Hasnain et al. | |
| 5,839,187 A | 11/1998 | Sato et al. | |
| 5,851,664 A | 12/1998 | Bennett et al. | |
| 5,888,847 A | 3/1999 | Rostoker et al. | |
| 5,903,428 A | 5/1999 | Grimard et al. | |
| 5,996,218 A | 12/1999 | Shamouilian et al. | |
| 6,071,795 A | 6/2000 | Cheung et al. | |
| 6,080,650 A | 6/2000 | Edwards | |
| 6,081,414 A | 6/2000 | Flanigan et al. | |
| 6,130,445 A | 10/2000 | Wang et al. | |
| 6,319,778 B1 | 11/2001 | Chen et al. | |
| 6,335,263 B1 | 1/2002 | Cheung et al. | |
| D456,724 S | 5/2002 | Wilson | |
| 6,403,985 B1 | 6/2002 | Fan et al. | |
| 6,410,942 B1 | 6/2002 | Thibeault et al. | |
| 6,416,196 B1 | 7/2002 | Lemarchand et al. | |
| 6,420,242 B1 | 7/2002 | Cheung et al. | |
| 6,427,901 B2 | 8/2002 | Dautartas | |
| D463,987 S | 10/2002 | Wilson | |
| 6,521,511 B1 | 2/2003 | Inoue et al. | |
| D474,984 S | 5/2003 | Wilson | |
| 6,558,109 B2 | 5/2003 | Gibbel | |
| 6,586,875 B1 | 7/2003 | Chen et al. | |
| 6,613,610 B2 | 9/2003 | Iwafuchi et al. | |
| 6,629,553 B2 | 10/2003 | Odashima et al. | |
| 6,670,038 B2 | 12/2003 | Sun et al. | |
| 6,683,368 B1 | 1/2004 | Mostafazadeh | |
| 6,762,069 B2 | 7/2004 | Huang et al. | |
| 6,765,503 B1* | 7/2004 | Chan et al. | 341/22 |
| 6,786,390 B2 | 9/2004 | Yang et al. | |
| 6,813,291 B2 | 11/2004 | Wang et al. | |
| 6,825,105 B2 | 11/2004 | Grover et al. | |
| 6,878,607 B2 | 4/2005 | Inoue et al. | |
| 6,911,666 B2 | 6/2005 | Voutsas | |
| 6,946,322 B2 | 9/2005 | Brewer | |
| D513,997 S | 1/2006 | Wilson | |
| 7,033,842 B2 | 4/2006 | Haji et al. | |
| 7,148,127 B2 | 12/2006 | Oohata et al. | |
| 7,160,633 B2 | 1/2007 | Tai et al. | |
| 7,165,711 B2 | 1/2007 | Barretto et al. | |
| 7,199,397 B2 | 4/2007 | Huang et al. | |
| 7,208,337 B2 | 4/2007 | Eisert et al. | |
| D543,122 S | 5/2007 | Lafever et al. | |
| 7,335,527 B2 | 2/2008 | Sawyer et al. | |
| 7,353,596 B2 | 4/2008 | Shida et al. | |
| 7,358,158 B2 | 4/2008 | Aihara et al. | |
| 7,439,549 B2 | 10/2008 | Marchl et al. | |
| 7,482,059 B2 | 1/2009 | Peng et al. | |
| 7,482,696 B2 | 1/2009 | Shei et al. | |
| 7,510,889 B2 | 3/2009 | Pan et al. | |
| 7,560,738 B2 | 7/2009 | Liu | |
| 7,585,703 B2 | 9/2009 | Matsumura et al. | |
| 7,628,309 B1 | 12/2009 | Eriksen et al. | |
| 7,642,710 B2 | 1/2010 | Yao et al. | |
| 7,669,210 B2 | 2/2010 | Izumisawa | |
| 7,714,336 B2 | 5/2010 | Imai | |
| 7,719,187 B2 | 5/2010 | Ray et al. | |
| 7,723,764 B2 | 5/2010 | Oohata et al. | |
| 7,785,481 B2 | 8/2010 | Wang | |
| 7,795,629 B2 | 9/2010 | Watanabe et al. | |
| 7,795,804 B2 | 9/2010 | Kim | |
| 7,797,820 B2 | 9/2010 | Shida et al. | |
| 7,829,366 B2 | 11/2010 | Miller et al. | |
| 7,838,410 B2 | 11/2010 | Hirao et al. | |
| 7,854,365 B2 | 12/2010 | Li et al. | |
| 7,880,184 B2 | 2/2011 | Iwafuchi et al. | |
| 7,884,543 B2 | 2/2011 | Doi | |
| 7,888,690 B2 | 2/2011 | Iwafuchi et al. | |
| 7,906,787 B2 | 3/2011 | Kang | |
| 7,910,945 B2 | 3/2011 | Donofrio et al. | |
| D636,686 S | 4/2011 | Cobbett et al. | |
| 7,927,976 B2 | 4/2011 | Menard | |
| 7,928,465 B2 | 4/2011 | Lee et al. | |
| 7,929,195 B2 | 4/2011 | Bifano | |
| D637,094 S | 5/2011 | Cobbett et al. | |
| D638,327 S | 5/2011 | Cobbett et al. | |
| D638,736 S | 5/2011 | Cobbett et al. | |
| 7,943,497 B2 | 5/2011 | Nakai | |
| 7,952,043 B2* | 5/2011 | Lin | 200/310 |
| 7,953,134 B2 | 5/2011 | Chin et al. | |
| 7,972,031 B2 | 7/2011 | Ray et al. | |
| 7,972,875 B2 | 7/2011 | Rogers et al. | |
| 7,989,266 B2 | 8/2011 | Borthakur et al. | |
| 7,992,332 B2 | 8/2011 | Lowenthal et al. | |
| 7,999,454 B2 | 8/2011 | Winters et al. | |
| 8,023,248 B2 | 9/2011 | Yonekura et al. | |
| 8,076,670 B2 | 12/2011 | Slater, Jr. et al. | |
| 8,133,768 B2 | 3/2012 | Ray et al. | |
| 8,182,303 B2 | 5/2012 | Ray et al. | |
| 8,183,772 B2 | 5/2012 | Ray et al. | |
| 8,186,568 B2 | 5/2012 | Coronel et al. | |
| 8,264,777 B2 | 9/2012 | Skipor et al. | |
| 8,294,168 B2 | 10/2012 | Park et al. | |
| 8,329,485 B2 | 12/2012 | McKean | |
| 8,333,860 B1 | 12/2012 | Bibl et al. | |
| 8,349,116 B1 | 1/2013 | Bibl et al. | |
| 8,381,965 B2 | 2/2013 | Jang et al. | |
| 8,383,506 B1 | 2/2013 | Golda et al. | |
| 8,384,630 B2 | 2/2013 | Ray et al. | |
| 8,395,312 B2 | 3/2013 | Hum | |
| 8,395,568 B2 | 3/2013 | Ray et al. | |
| 8,415,767 B1 | 4/2013 | Golda et al. | |
| 8,415,768 B1 | 4/2013 | Golda et al. | |
| 8,415,771 B1 | 4/2013 | Golda et al. | |
| 8,415,879 B2 | 4/2013 | Lowenthal et al. | |
| 8,426,227 B1 | 4/2013 | Bibl et al. | |

(56) References Cited

U.S. PATENT DOCUMENTS

| | | |
|---|---|---|
| 8,454,859 B2 | 6/2013 | Lowenthal et al. |
| 8,456,392 B2 | 6/2013 | Ray et al. |
| 8,456,393 B2 | 6/2013 | Ray et al. |
| D687,736 S | 8/2013 | Wycoff |
| 8,506,867 B2 | 8/2013 | Menard |
| D688,968 S | 9/2013 | Guerrero, II |
| 8,552,436 B2 | 10/2013 | Bibl et al. |
| 8,558,243 B2 | 10/2013 | Bibl et al. |
| 8,569,115 B1 | 10/2013 | Golda et al. |
| 8,573,469 B2 | 11/2013 | Hu et al. |
| 8,646,505 B2 | 2/2014 | Bibl et al. |
| 8,664,699 B2 | 3/2014 | Nuzzo et al. |
| 8,674,593 B2 | 3/2014 | Lowenthal et al. |
| 8,686,542 B2 | 4/2014 | Golda et al. |
| 8,716,767 B2 | 5/2014 | Golda et al. |
| 8,739,440 B2 | 6/2014 | Lowenthal et al. |
| 8,739,441 B2 | 6/2014 | Lowenthal et al. |
| 8,753,946 B2 | 6/2014 | Ray et al. |
| 8,753,947 B2 | 6/2014 | Ray et al. |
| 8,772,814 B2 | 7/2014 | Ray et al. |
| 8,789,573 B2 | 7/2014 | Bibl et al. |
| 8,791,474 B1 | 7/2014 | Bibl et al. |
| 8,791,530 B2 | 7/2014 | Bibl et al. |
| 8,794,501 B2 | 8/2014 | Bibl et al. |
| 8,809,126 B2 | 8/2014 | Lowenthal et al. |
| 8,809,875 B2 | 8/2014 | Bibl et al. |
| 8,835,940 B2 | 9/2014 | Hu et al. |
| 8,846,457 B2 | 9/2014 | Lowenthal et al. |
| 8,852,467 B2 | 10/2014 | Lowenthal et al. |
| 8,853,939 B2 | 10/2014 | Ray et al. |
| 8,877,101 B2 | 11/2014 | Lowenthal et al. |
| 8,877,648 B2 | 11/2014 | Bower et al. |
| 8,889,216 B2 | 11/2014 | Ray et al. |
| 8,889,485 B2 | 11/2014 | Bower |
| 8,906,713 B2 | 12/2014 | Rettke |
| 8,921,437 B2 | 12/2014 | Knott et al. |
| 8,933,433 B2 | 1/2015 | Higginson et al. |
| 8,934,259 B2 | 1/2015 | Bower et al. |
| 8,940,627 B2 | 1/2015 | Blanchard et al. |
| 8,941,215 B2 | 1/2015 | Hu et al. |
| 8,945,968 B2 | 2/2015 | Bibl et al. |
| 8,963,168 B1 | 2/2015 | Rettke |
| 8,982,446 B2 | 3/2015 | Ray |
| 8,987,765 B2 | 3/2015 | Bibl et al. |
| 8,999,742 B1 | 4/2015 | Lowenthal et al. |
| 9,000,566 B2 | 4/2015 | Golda et al. |
| 9,012,945 B2 | 4/2015 | Ray |
| 9,018,833 B2 | 4/2015 | Lowenthal et al. |
| 9,034,754 B2 | 5/2015 | Golda et al. |
| 9,035,174 B2 | 5/2015 | Youngbull et al. |
| 9,035,279 B2 | 5/2015 | Hu et al. |
| 9,044,926 B2 | 6/2015 | Golda et al. |
| 9,047,818 B1 | 6/2015 | Day et al. |
| 9,048,031 B2 | 6/2015 | Ray et al. |
| 9,074,758 B2 | 7/2015 | Oraw et al. |
| 9,083,010 B2 | 7/2015 | Lockett et al. |
| 9,099,568 B2 | 8/2015 | Blanchard |
| 9,105,492 B2 | 8/2015 | Bibl et al. |
| 9,105,714 B2 | 8/2015 | Hu et al. |
| 9,105,812 B2 | 8/2015 | Lowenthal et al. |
| 9,119,244 B2 | 8/2015 | Lowenthal et al. |
| D738,748 S | 9/2015 | Bibl et al. |
| D738,749 S | 9/2015 | Bibl et al. |
| 9,130,124 B2 | 9/2015 | Lowenthal et al. |
| 9,136,065 B2 | 9/2015 | Lockett et al. |
| 9,136,161 B2 | 9/2015 | Bibl et al. |
| 9,142,535 B2 | 9/2015 | Oraw |
| 9,153,548 B2 | 10/2015 | Chan et al. |
| 9,153,732 B2 | 10/2015 | Oraw |
| 9,177,992 B2 | 11/2015 | Blanchard et al. |
| 9,196,606 B2 | 11/2015 | Oraw |
| 9,200,758 B2 | 12/2015 | Lowenthal et al. |
| 9,209,348 B2 | 12/2015 | Hu et al. |
| 9,217,541 B2 | 12/2015 | Bathurst et al. |
| 9,224,629 B2 | 12/2015 | Golda et al. |
| 9,236,527 B2 | 1/2016 | Ray et al. |
| 9,236,528 B2 | 1/2016 | Ray et al. |
| 9,236,815 B2 | 1/2016 | Golda et al. |
| 9,240,397 B2 | 1/2016 | Bibl et al. |
| 9,255,001 B2 | 2/2016 | Golda et al. |
| 2001/0029088 A1 | 10/2001 | Odajima et al. |
| 2002/0022308 A1 | 2/2002 | Ahn et al. |
| 2002/0036471 A1 | 3/2002 | Silvestre |
| 2002/0056740 A1 | 5/2002 | Hayashi |
| 2002/0076848 A1 | 6/2002 | Spooner et al. |
| 2002/0171518 A1 | 11/2002 | Hsu et al. |
| 2002/0196618 A1 | 12/2002 | Douzono et al. |
| 2003/0010975 A1 | 1/2003 | Gibb et al. |
| 2003/0017360 A1 | 1/2003 | Tai et al. |
| 2003/0040142 A1 | 2/2003 | Lin et al. |
| 2003/0151908 A1 | 8/2003 | Fried |
| 2003/0169786 A1 | 9/2003 | Kapon et al. |
| 2004/0110027 A1 | 6/2004 | Chen et al. |
| 2004/0124490 A1 | 7/2004 | Bohr et al. |
| 2004/0161943 A1 | 8/2004 | Ren et al. |
| 2004/0227704 A1 | 11/2004 | Wang et al. |
| 2004/0232439 A1 | 11/2004 | Gibb et al. |
| 2004/0266048 A1 | 12/2004 | Platt et al. |
| 2005/0104530 A1 | 5/2005 | Chung et al. |
| 2005/0210988 A1 | 9/2005 | Amano et al. |
| 2005/0232728 A1 | 10/2005 | Rice et al. |
| 2005/0274959 A1 | 12/2005 | Kim et al. |
| 2006/0037848 A1 | 2/2006 | Kobayashi |
| 2006/0055035 A1 | 3/2006 | Lin et al. |
| 2006/0154390 A1 | 7/2006 | Tran et al. |
| 2006/0157721 A1 | 7/2006 | Tran et al. |
| 2006/0160276 A1 | 7/2006 | Brown et al. |
| 2006/0169993 A1 | 8/2006 | Fan et al. |
| 2006/0202210 A1 | 9/2006 | Mok et al. |
| 2006/0208271 A1 | 9/2006 | Kim et al. |
| 2006/0214299 A1 | 9/2006 | Fairchild et al. |
| 2006/0238463 A1 | 10/2006 | Kim et al. |
| 2007/0014920 A1 | 1/2007 | Syms |
| 2007/0048902 A1 | 3/2007 | Hiatt et al. |
| 2007/0115263 A1* | 5/2007 | Taylor .................. G06F 1/1616 345/169 |
| 2007/0152965 A1 | 7/2007 | Krzyzanowski et al. |
| 2007/0166851 A1 | 7/2007 | Tran et al. |
| 2007/0194330 A1 | 8/2007 | Ibbetson et al. |
| 2007/0235306 A1* | 10/2007 | Chiba .................. H01H 13/83 200/314 |
| 2008/0001787 A1 | 1/2008 | Smith et al. |
| 2008/0048206 A1 | 2/2008 | Lee et al. |
| 2008/0048520 A1 | 2/2008 | Gulvin et al. |
| 2008/0194054 A1 | 8/2008 | Lin et al. |
| 2008/0196237 A1 | 8/2008 | Shinya et al. |
| 2008/0303038 A1 | 12/2008 | Grotsch et al. |
| 2008/0315236 A1 | 12/2008 | Lu et al. |
| 2009/0014749 A1 | 1/2009 | Matsuda |
| 2009/0068774 A1 | 3/2009 | Slater, Jr. et al. |
| 2009/0072382 A1 | 3/2009 | Guzek |
| 2009/0140282 A1 | 6/2009 | Wu et al. |
| 2009/0146303 A1 | 6/2009 | Kwon |
| 2009/0173610 A1 | 7/2009 | Bronstein et al. |
| 2009/0224947 A1 | 9/2009 | Frazier |
| 2009/0231857 A1 | 9/2009 | Ito et al. |
| 2009/0284501 A1 | 11/2009 | Nathan et al. |
| 2009/0301176 A1 | 12/2009 | Rowe et al. |
| 2009/0303713 A1 | 12/2009 | Chang et al. |
| 2009/0314991 A1 | 12/2009 | Cho et al. |
| 2010/0039747 A1 | 2/2010 | Sansoni et al. |
| 2010/0046134 A1 | 2/2010 | Mizuno et al. |
| 2010/0051910 A1 | 3/2010 | Choi |
| 2010/0097246 A1 | 4/2010 | Watanabe et al. |
| 2010/0097738 A1 | 4/2010 | Kang et al. |
| 2010/0123164 A1 | 5/2010 | Suehiro et al. |
| 2010/0142114 A1 | 6/2010 | Purohit et al. |
| 2010/0149720 A1 | 6/2010 | Fujisawa et al. |
| 2010/0178139 A1 | 7/2010 | Sundar et al. |
| 2010/0188794 A1 | 7/2010 | Park et al. |
| 2010/0200884 A1 | 8/2010 | Lee et al. |
| 2010/0203659 A1 | 8/2010 | Akaike et al. |
| 2010/0203661 A1 | 8/2010 | Hodota |
| 2010/0213471 A1 | 8/2010 | Fukasawa et al. |

(56) References Cited

U.S. PATENT DOCUMENTS

| | | |
|---|---|---|
| 2010/0214777 A1 | 8/2010 | Suehiro et al. |
| 2010/0238120 A1* | 9/2010 | Hsieh .................. G06F 3/0202 345/170 |
| 2010/0244077 A1 | 9/2010 | Yao |
| 2010/0276726 A1 | 11/2010 | Cho et al. |
| 2010/0288607 A1 | 11/2010 | Ozias et al. |
| 2010/0302169 A1* | 12/2010 | Pance .................. G06F 3/0237 345/170 |
| 2010/0309100 A1 | 12/2010 | Cok et al. |
| 2011/0003410 A1 | 1/2011 | Tsay et al. |
| 2011/0049540 A1 | 3/2011 | Wang et al. |
| 2011/0057866 A1 | 3/2011 | Konicek |
| 2011/0089464 A1 | 4/2011 | Lin et al. |
| 2011/0121462 A1 | 5/2011 | Kim |
| 2011/0132655 A1 | 6/2011 | Horiguchi et al. |
| 2011/0132656 A1 | 6/2011 | Horiguchi et al. |
| 2011/0136324 A1 | 6/2011 | Ashdown et al. |
| 2011/0143467 A1 | 6/2011 | Xiong et al. |
| 2011/0151602 A1 | 6/2011 | Speier |
| 2011/0159615 A1 | 6/2011 | Lai |
| 2011/0165707 A1 | 7/2011 | Lott et al. |
| 2011/0198598 A1 | 8/2011 | Kim et al. |
| 2011/0210357 A1 | 9/2011 | Kaiser et al. |
| 2011/0247925 A1 | 10/2011 | Lin |
| 2011/0249423 A1 | 10/2011 | Ho et al. |
| 2011/0284867 A1 | 11/2011 | Tran et al. |
| 2011/0291134 A1 | 12/2011 | Kang |
| 2011/0291572 A1* | 12/2011 | Burroughes ........ H01L 27/3255 315/152 |
| 2011/0297914 A1 | 12/2011 | Zheng et al. |
| 2011/0309382 A1 | 12/2011 | Lowgren |
| 2011/0312131 A1 | 12/2011 | Renavikar et al. |
| 2012/0012448 A1* | 1/2012 | Pance .................. H01H 13/83 200/5 A |
| 2012/0013490 A1 | 1/2012 | Pance |
| 2012/0027557 A1 | 2/2012 | Ashdown et al. |
| 2012/0032573 A1 | 2/2012 | Lai |
| 2012/0048700 A1 | 3/2012 | Liu |
| 2012/0048702 A1 | 3/2012 | Liu |
| 2012/0064642 A1 | 3/2012 | Huang et al. |
| 2012/0134065 A1 | 5/2012 | Furuya et al. |
| 2012/0146030 A1 | 6/2012 | You et al. |
| 2012/0161113 A1* | 6/2012 | Lowenthal ............ H01L 25/048 257/40 |
| 2012/0164796 A1 | 6/2012 | Lowenthal et al. |
| 2012/0168714 A1 | 7/2012 | Chu et al. |
| 2012/0199455 A1 | 8/2012 | Niu et al. |
| 2012/0223875 A1 | 9/2012 | Lau et al. |
| 2012/0234043 A1 | 9/2012 | Guerrero, II |
| 2012/0248477 A1* | 10/2012 | Tischler ................ H01L 27/156 257/89 |
| 2012/0286208 A1 | 11/2012 | McKean et al. |
| 2012/0326188 A1 | 12/2012 | Han |
| 2013/0015985 A1* | 1/2013 | Peterson et al. ................. 341/27 |
| 2013/0019996 A1 | 1/2013 | Routledge |
| 2013/0038416 A1 | 2/2013 | Arai et al. |
| 2013/0044215 A1 | 2/2013 | Rothkopf et al. |
| 2013/0121017 A1 | 5/2013 | Tsai |
| 2013/0134591 A1 | 5/2013 | Sakamoto et al. |
| 2013/0161682 A1 | 6/2013 | Liang et al. |
| 2013/0187179 A1 | 7/2013 | Tan et al. |
| 2013/0210194 A1 | 8/2013 | Bibl et al. |
| 2013/0285086 A1 | 10/2013 | Hu et al. |
| 2013/0343053 A1* | 12/2013 | Holman ................ G03B 21/00 362/241 |
| 2014/0035960 A1 | 2/2014 | You et al. |
| 2014/0061687 A1 | 3/2014 | Hu et al. |
| 2014/0104243 A1 | 4/2014 | Sakariya et al. |
| 2014/0132154 A1 | 5/2014 | Fried |
| 2014/0159064 A1 | 6/2014 | Sakariya et al. |
| 2014/0159065 A1 | 6/2014 | Hu et al. |
| 2014/0159067 A1 | 6/2014 | Sakariya et al. |
| 2014/0166456 A1 | 6/2014 | Chen |
| 2014/0168037 A1 | 6/2014 | Sakariya et al. |
| 2014/0169927 A1 | 6/2014 | Golda et al. |
| 2014/0241844 A1 | 8/2014 | Golda et al. |
| 2015/0022995 A1 | 1/2015 | Peterson et al. |
| 2015/0136573 A1 | 5/2015 | Peterson et al. |

FOREIGN PATENT DOCUMENTS

| | | |
|---|---|---|
| EP | 1780798 | 5/2007 |
| JP | 2004213924 A | 7/2004 |
| JP | 2006060334 A | 3/2006 |
| JP | 2007280810 A | 10/2007 |
| JP | 2010511239 A | 4/2010 |
| JP | 3171486 U | 10/2011 |
| JP | 2013504861 A | 2/2013 |
| WO | WO0067543 | 11/2000 |
| WO | WO03012884 | 2/2003 |
| WO | WO2004032247 | 4/2004 |
| WO | WO2005099310 | 10/2005 |
| WO | WO2008143635 | 11/2008 |
| WO | WO2011072372 | 6/2011 |
| WO | WO2011102030 | 8/2011 |
| WO | WO2011123285 | 10/2011 |
| WO | WO2012044262 | 4/2012 |
| WO | WO2013074357 | 5/2013 |
| WO | WO2013074370 | 5/2013 |
| WO | WO2014130353 | 8/2014 |
| WO | WO2014149864 | 9/2014 |
| WO | WO2014204694 | 12/2014 |
| WO | WO2014204695 | 12/2014 |
| WO | WO2015006000 | 1/2015 |
| WO | WO2015094600 | 6/2015 |
| WO | WO2015094601 | 6/2015 |
| WO | WO2015099944 | 7/2015 |

OTHER PUBLICATIONS

"Keyboard Backlight Uses Less Power, Fewer LEDs," retrieved on Jun. 14, 2013 at <<www.designworldonlin.com/keyboard-backlight-uses-less-power-fewer-leds/#_>>, Design World, Jun. 9, 2008, pp. 1-3.

Office action for U.S. Appl. No. 14/507,729, dated Mar. 11, 2016, Peterson et al., "Keyboard Backlighting with Deposited Light-Generating Sources", 18 pages.

Translated Japanese Office Action dated Nov. 13, 2018 for Japanese patent application No. 2016-519634, a counterpart foreign application of U.S. Appl. No. 14/390,393, 7 pages.

The Chinese Office Action dated Sep. 30, 2018, for Chinese Patent Application No. 201480043264.3, acounterpart foreign patent application of U.S. Appl. No. 14/390,393, 4 pages.

The European Office Action dated Oct. 18, 2018 for European Patetn Application No. 14811725.2, a counterpart foreign application of the U.S. Appl. No. 14/390,393, 7 pages.

Translated Japanese Office Action dated Mar. 27, 2018 for Japanese patent application No. 2016-519634, a counterpart foreign application of U.S. Appl. No. 14/390,393, 6 pages.

Office action for U.S. Appl. No. 14/390,393, dated Oct. 12, 2016, Peterson et al., "Keyboard Backlighting With Deposited Light-Generating Sources", 9 pages.

Office action for U.S. Appl. No. 14/507,308, dated Oct. 3, 2016, Peterson et al., "Keyboard Backlighting With Deposited Light-Generating Sources", 22 pages.

Office action for U.S. Appl. No. 14/507,729, dated Jul. 29, 2016, Peterson et al., "Keyboard Backlighting with Deposited Light-Generating Sources", 19 pages.

Office action for U.S. Appl. No. 14/507,729, dated Jan. 11, 2017, Peterson et al., "Keyboard Backlighting with Deposited Light-Generating Sources", 30 pages.

Office action for U.S. Appl. No. 14/390,393, dated Jan. 18, 2017, Peterson et al., "Keyboard Backlighting With Deposited Light-Generating Sources", 9 pages.

Office action for U.S. Appl. No. 14/507,308, dated Feb. 7, 2017, Peterson et al., "Keyboard Backlighting With Deposited Light-Generating Sources", 30 pages.

(56) References Cited

OTHER PUBLICATIONS

The Extended European Search Report dated Mar. 1, 2017 for European Patent Application No. 14811725.2, 8 pages.
PCT Search Report and Written Opinion dated Jun. 29, 2017 for PCT Application No. PCT/US17/13817, 7 pages.

* cited by examiner

KEYBOARD BACKLIGHTING WITH DEPOSITED LIGHT-GENERATING SOURCES

PRIORITY CLAIM AND CROSS-REFERENCE TO RELATED APPLICATIONS

This application claims the benefit under 35 U.S.C. § 119(e)(1) of U.S. Provisional Application No. 61/834,406, filed Jun. 12, 2013; No. 61/834,418, filed Jun. 12, 2013; No. 61/834,669, filed Jun. 13, 2013; No. 61/835,504, filed Jun. 14, 2013; No. 61/836,086, filed Jun. 17, 2013; No. 61/836,632, filed Jun. 18, 2013; No. 61/837,132, filed Jun. 19, 2013; No. 61/894,824, filed Oct. 23, 2013; No. 61/903,396, filed Nov. 13, 2013; and No. 61/909,290, filed Nov. 26, 2013, which are hereby incorporated by reference in their entirety.

BACKGROUND

Due to their portability, connectivity, flexibility, and capabilities like that of a desktop computer, many people use laptops frequently and, indeed, daily. The keyboards of typical laptop computers and mobile devices (such as a smartphone) are thin, lightweight, and compact.

Unfortunately, conventional backlighting of keyboards adds complications, such as additional thickness to the overall keyboard assembly.

FIG. 1 shows an exploded view of a typical keyboard assembly 100 of a laptop computer or other mobile computing device. Such assemblies are also called keyboard stacks. The major components of this assembly 100 are shown without much detail. The primary purpose of FIG. 1 is to show the relationship amongst the major components of a typical keyboard assembly 100 of a laptop computer or mobile device.

Referring to FIGS. 1 and 2, the keyboard assembly 100 includes the following major component layers (from top to bottom): Key layer 102, keyboard mechanics layer 104, a sensor layer 106, a backplate layer 108, and a lightplate layer 110.

The key layer 102 includes, for example, a top bezel around one or more keytops 210. Below the key layer 102 is the keyboard mechanics layer 104. Typically, this layer 104 includes keypress functional components such as a resist-and-return structure 220 and a leveling structure 230. Often, the resist-and-return structure 220 components include a collapsible elastomeric plunger (i.e., "rubber dome"). Similarly, the leveling structure 230 often comprises a scissor mechanism 232, 244, or the like. The keyboard mechanics are discussed more below with regard to FIG. 2.

Under the keyboard mechanics layer 104 is the sensor layer 106. The purpose of the sensor layer 106 is to detect a keypress of one or more of the keys 200. To that end, it has electronic circuitry (e.g., one or more sensors 260) to sense the downward pressing of the key 200 by a user. The most common type of sensor 260 utilizes a conductive or contact switch under each key. Other sensing technologies (such as capacitive and electrical resistance) may also be employed. The sensor layer 106 is also often called the "keyswitch" layer or the "sensor membrane" layer.

A conventional keyboard assembly 100 typically utilizes a sensor membrane layer 106 of at least three substrates and one or more conductive-based switches 260 to detect key depressions. A first substrate and second substrate each have contact switch circuitry. The first and second substrates are separated by a third non-conductive substrate disposed therebetween. The non-conductive substrate between the two conductive substrates has a hole therethrough that allows the underkey contacts of each conductive substrate to trampoline together upon a keypress. This action closes a switch 260 and indicates a keypress.

A controller (not shown) associated with the keyboard assembly 100 detects that a particular key 200 is depressed and sends that information to a processor or other computing device. Of course, other keyboard assemblies 100 can use different key press detection technologies, such as capacitive and resistive.

The keyboard mechanics 230 are attached to the rigid backplate 240 of the backplate layer 108. Typically, such a backplate 240 (i.e., "backer") is made from a strong material like steel, aluminum, or other metal. Under the backplate layer 108 is the lightplate layer 110.

The lightplate 270 (i.e., light guide plate or lightguide) of the lightplate layer 110 can employ conventional light-emitting diodes (LEDs) as an illuminant. Typically, the LEDs are mounted on the outer edge of the keyboard assembly 100 and away from the keys 200 themselves. The light from the LEDs is guided to the interior of the keyboard 100 via the light guide plate 270. Diffusers (e.g., etched dots or patterns) under the keys catch the light and diffuse it under each key. Therefore, in an area with weak or no light, the legends on the keys 200 of the keyboard 100 can be seen by the light emitted from the light guide plate 270, thereby facilitating to operate.

Generally, a conventional lightplate layer 110 has a light-generating component (e.g., LEDs) to one or more edges of the keyboard 100 so as that it is not under any actual keys 200. That light-generating component is thick, because it generally comprises a flexible printed circuit (FPC) that contains conventional LEDs.

The conventional lightplate layer 110 is designed to diffuse the light of its light guides through diffusers. A diffuser may be a series of unevenly-spaced bumps, etched dots, or some uneven pattern to scatter the light of the light guide 270. The density of bumps increases further away from the light source according to a diffusion equation. The diffused light then travels to either side of the diffuser. The front of the lightplate 270 faces the actual desired goal, which is the underside of the key. The back of the lightplate 270 has a reflector to reflect otherwise wasted light back toward the underside of the keytop 210.

The conventional lightplate layer 110 has three substrates (from top to bottom): a Mylar mask substrate, a light guide substrate, and reflector substrate. The Mylar mask substrate masks the key webs. The light guide substrate is a clear material (e.g., silicon) consisting of light guides (e.g., light paths) and diffusers under keys to diffuse the light on the guides. The reflector substrate reflects the light up towards the keys above. The reflector substrate is sometimes made of aluminum foil, sometimes merely a white-pigmented surface or, as in the 3M Vikuiti ESR, consists of hundreds of polymer layers of alternating low and high refractive index. A conventional lightplate layer 110 is about 0.25-0.5 mm thick.

FIG. 2 illustrates a side elevation view of a simplified key assembly ("key") 200 of a conventional keyboard 100 of a typical computer system. The components of the key assembly 200 are not shown to scale. Also, they are not shown with proper relative proportions to the size and thickness of the other components. Rather, the components are shown in the order of the keyboard stack described and with regard to the relationships to each other.

Stripped down to its essentials, the conventional key assembly 200 includes a keycap 210 (e.g., keytop), a collapsible elastomeric plunger (i.e., "rubber dome") 220, a scissor-mechanism 230, a rigid base 240, a keyswitch sensor 260, and a lightplate 270.

The layers of keyboard assembly 100 correspond to this key assembly 200 in the following manner:

- the key layer 102 includes the keycap 210 (typical thickness is 0.3-0.5 mm);
- the key mechanics layer 104 includes the rubber dome 220 and scissor-mechanism 230 (typical thickness is 1.5-2.5 mm);
- the sensor layer 106 includes the keyswitch sensor 260 (typical thickness is 0.25 mm);
- the backplate layer 108 includes the base 240 (typical thickness is 0.25-0.5 mm);
- the lightplate layer 110 includes the lightplate 270 (typical thickness is 0.25-0.5 mm).

The rubber dome 220 provides a familiar snap-over feel to a user while she presses the key 200 to engage the keyswitch sensor 260 under the keytop 210. The primary purpose for the scissor-mechanism 230 is to level the keytop 210 during its keypress.

Typically, the scissor mechanism 230 includes at least a pair of interlocking rigid (e.g., plastic or metal) blades (232, 234) that connect the keycap 210 to the base 240 and/or body of the keyboard 100. The interlocking blades 232, 234 move in a "scissor"-like fashion when the keycap 210 travels along its vertical path, as indicated by Z-direction arrow 250. The arrangement of the scissor mechanism 230 reduces the wobbling, shaking, or tilting of the keycap 210 while the user is depressing it.

As can be seen in both assemblies (100 and 200), the light from the lightplate 270 (e.g., lightplate layer 110) must make its way past many obstructions to arrive under the keycap 210 and to ultimately illuminate a transparent or translucent legend (e.g., "A" or "Shift") of a key 210. The obstructions include the backplate layer 108, sensor layer 106, keyboard mechanics layer 104 (such as rubber dome 220 and scissor-mechanism 230), and other structures under the keycap 210 itself.

In conventional keyboards 100, a narrow unobstructed path is designed under each key 210 to aid the under illumination of each key 200. Holes are punched in the backplate 240. Clear windows are strategically placed in the sensor layer 106. Of course, the diffusion etchings in the lightplate 270 are placed under those narrow paths under the keys 200.

Of course, these narrow unobstructed paths affect the design and function of the other components of the keyboard stack 100. Too many holes compromise the rigidity of the backplate layer 108. Arrangement of the keyboard mechanics 220, 230 cannot be adjusted too much without compromising its functionality and durability.

One apparent option to reduce obstruction is to place the lightplate layer 110 higher in the stack 100, for example, above the backplate layer 108 or above the sensor layer 106. However, using conventional materials, this cannot be accomplished.

While not shown, the keyboard assemblies 100 include vertical support structures. To provide structural support to the whole keyboard 100, the vertical support structures attach to the backplate layer 108. The backplate layer 108, in turn, is attached to the housing of the device itself.

Because of the vertical support structures, the lightplate layer 110 is traditionally placed below the backplate layer 108 rather than above it. When it is below the backplate layer 108, the lightplate layer 110 can be free of holes or, at least, have a minimum of holes therethrough. Above the backplate layer 108, the lightplate layer 110 must have several holes through which the vertical supports would pass therethrough.

In short, functionality of a conventional lightplate 270 is compromised greatly by having holes. The holes would cut or significantly redirect the light guides in the lightplate 270. Additional holes requires more redirection of light guides and limits the real estate available on the plate 270 for such guides. Every bend in the light guide leaks light.

Overall, this reduces the amount of light that ultimately arrives at each key 200. The keys 200 that are distant from the LEDs are most affected. Indeed, the number and placement of holes might result in little or no light arriving at the keys 200 that are particularly distant from the LEDs.

The background of U.S. Pat. No. 5,746,493 says this about conventional light guides and their issues:

A light guide or light conductor used to transmit light for illuminating a display and keyboard in a device typically is formed as a planar element of translucent material. A light guide is generally positioned as a layer on one side of the device's display panel and keyboard. Light sources, typically LEDs, are positioned along an edge of the light guide and light transmitted into it is diffused and distributed by the light guide to the display and keyboard.

A problem in conventional light guides is that light is not distributed uniformly, and the display panel and keys are accordingly not uniformly illuminated. Bright and dark areas thus result in the display and keys, which detracts from the appearance of the device.

This problem is related in part to the manner in which the light sources are positioned and/or coupled to the light guide. Conventionally, light sources are simply positioned along an edge of the light guide for the display panel and additional lights sources positioned in holes located in the interior of the light guide near the key holes. Light from the sources on the edge of the light guide is not uniformly transmitted across the edge of the light guide.

The problem is also related to how light exiting the light guides is handled at the edges. Light that strikes the edges is in part lost through the edge and in part reflected back in the light guide in a way that does not provide much useful illumination.

BRIEF DESCRIPTION OF THE DRAWINGS

The Detailed Description references the accompanying figures. In the figures, the left-most digit(s) of a reference number identifies the figure in which the reference number first appears. The same reference number references like features and components throughout the drawings.

DETAILED DESCRIPTION

Figure 1:
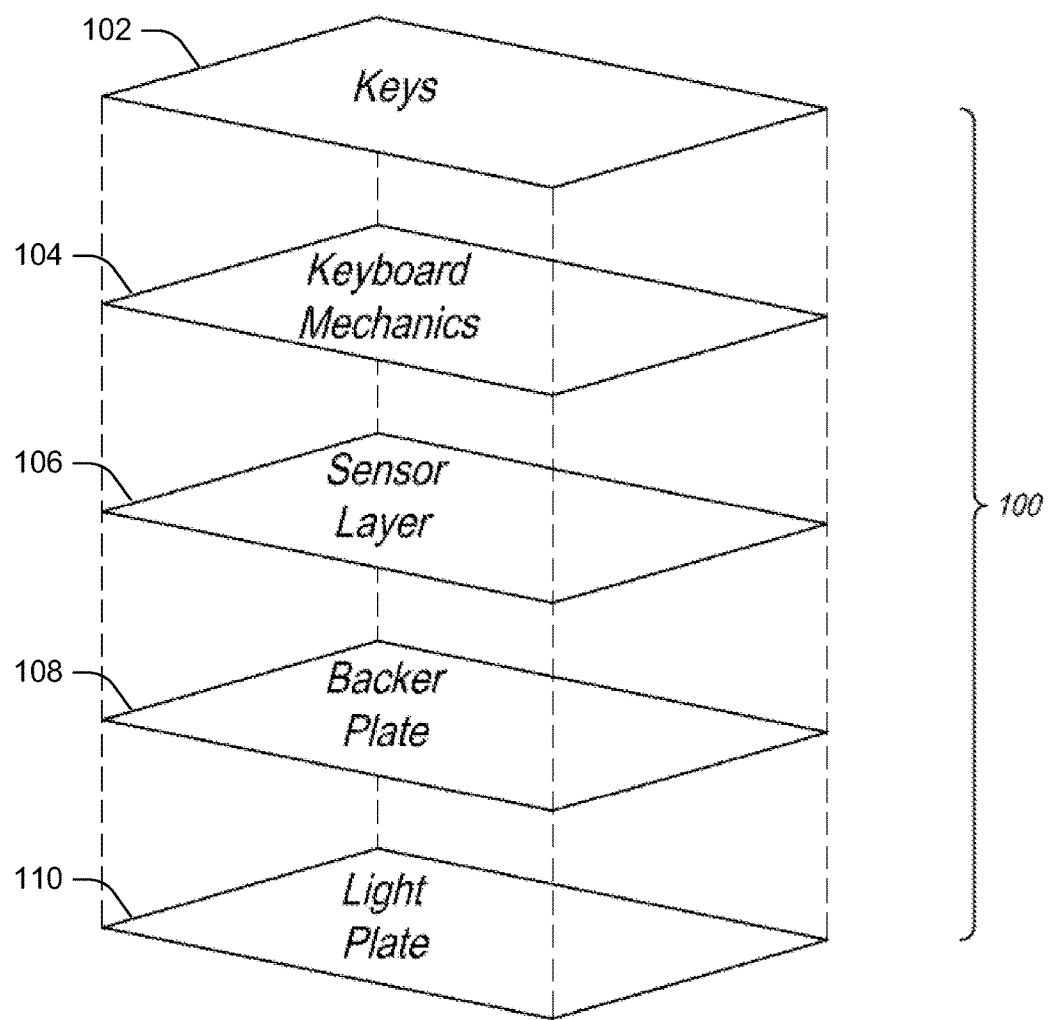
FIG. 1 is a schematic diagram illustrating an example layered keyboard assembly environment in which the techniques in accordance with the present disclosure may be implemented.

Techniques and devices provide backlighting for keys 200 of a keyboard 100 or keypad. The backlighting may be a replacement for existing backlighting in an existing keyboard 100, or it may be an original backlighting application for the keyboard 100. In particular, the technology disclosed herein utilizes light-generating sources 312 with new and heretofore unachievable properties. A plurality of light-generating sources 312 positioned substantially underneath a keytop 210, illuminates the key 200, 500 from underneath the keytop 210. For example, in one embodiment, at least two of the light-generating sources 312 of the plurality are located underneath the keytop 210 and within a footprint of the keytop 210.

Seemingly, all electronic devices are getting smaller and smaller. Computing devices are getting thinner and thinner. The thinness of laptop computers and other mobile devices with keyboards are constrained by many factors. Often, one of the factors that limit the thinness of such keyboarded devices is the keyboard itself. The thinnest of the conventional keyboard stack has been pushed to the limit of what conventional approaches can allow. A conventional laptop keyboard is about 3 mm to 6 mm thick.

The technology described herein focuses on one functional aspect of the typical stack of a backlit keyboard 100. That functional aspect is backlighting. The technology described herein provides the backlighting function in a way that enables the overall keyboard stack to be thinner.

As discussed in the Background section, the conventional backlighting solution involves a relatively thick lightplate layer 110 (which is typically about 0.25-0.5 mm thick) and an even thicker FPC (with the LEDs) tucked towards one or more edges of the keyboard.

Unlike the conventional lightplates 270, the lightplate 300 disclosed herein includes deposits of multiple extraordinarily tiny light-generating sources 312 under each backlit key 200 of a keyboard 100 (i.e., "underkey"). In at least one implementation, this is accomplished by placing the tiny light-generating sources 312 on a single thin lightplate 300 layer 110. In some implementations, that layer 110 is 0.07 to 0.25 mm thick or perhaps thinner. In some implementations, the layer 110 has a thickness of 0.07 to 0.25 mm. In an implementation, the lightplate 300 layer 110 material may be a polyester film or other suitable material.

In contrast to simply using one underkey light source, the lightplate 300 disclosed herein uses multiple underkey light-generating sources 312. Those reasons for doing so include, for example, increased illumination, consistency in illumination, and fault tolerance.

More light-generating sources produce more light. Also, with so many light sources under the key 200, the color and intensity of each source averages in with all the others sources. Therefore, source-to-source variation doesn't matter as much. The color and intensity of conventional LEDs can vary. Therefore, conventional LEDs are typically sorted based upon their color and intensity. Furthermore, having more sources helps to tolerate manufacturing faults. One failed source under a particular key 200 does not significantly affect the backlighting of that key 200.

Note that the diffusers of conventional lightplates 270 are not light-generating sources. Rather, the diffusers merely reflect the existing light of the light guide towards the underside of a key 200. The diffusers do not generate light themselves.

Example Lightplate

Various implementations described herein discuss depositing light-generating sources 312 onto particular components and/or layers of the keyboard assembly 100 to illuminate the keys 200 of the keyboard 100. However, in some implementations, the light-generating sources 312 are deposited onto a thin film lightplate 300, which is inserted between various layers of the keyboard assembly 100 to illuminate the keys 200. In many of the implementations, the lightplate 300 is positioned between the keytop(s) 210 of the keyboard assembly 100 and the backplate 240 of the keyboard assembly 100. A plurality of light-generating sources 312 is deposited on the lightplate 300 at a position that is substantially underneath the keytop(s) 210, such that the plurality of light-generating sources 312 illuminates the key(s) 200 from underneath the keytop(s) 210.

Figure 2:
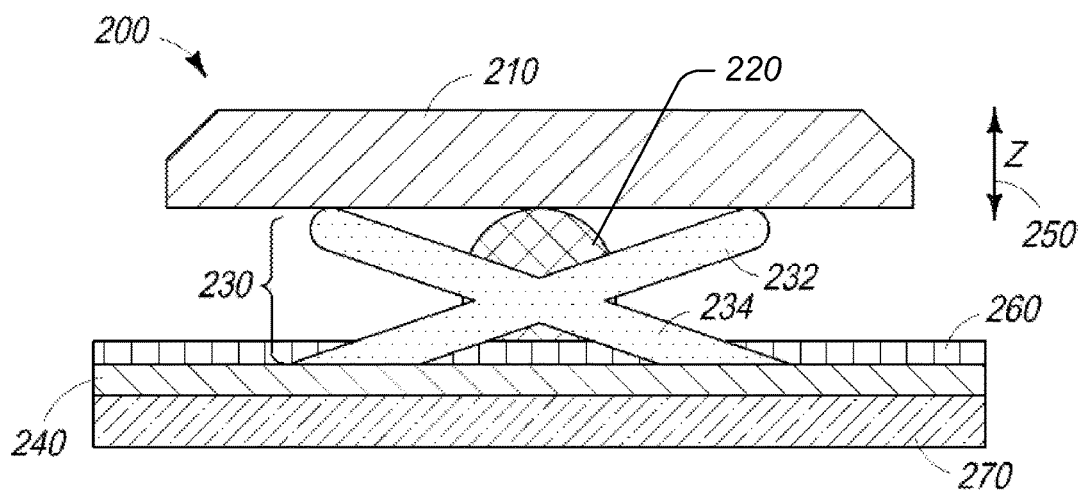
FIG. 2 is a schematic diagram illustrating a profile view of an example key assembly.

One implementation involves replacing the conventional lightplate 270 of existing typical keyboard assemblies (like that of FIGS. 1 and 2) with the new and thinner lightplate 300 of the technology described herein. In other words, the new lightplate 300 can be retrofit into an existing keyboard assembly 100.

Figure 3:
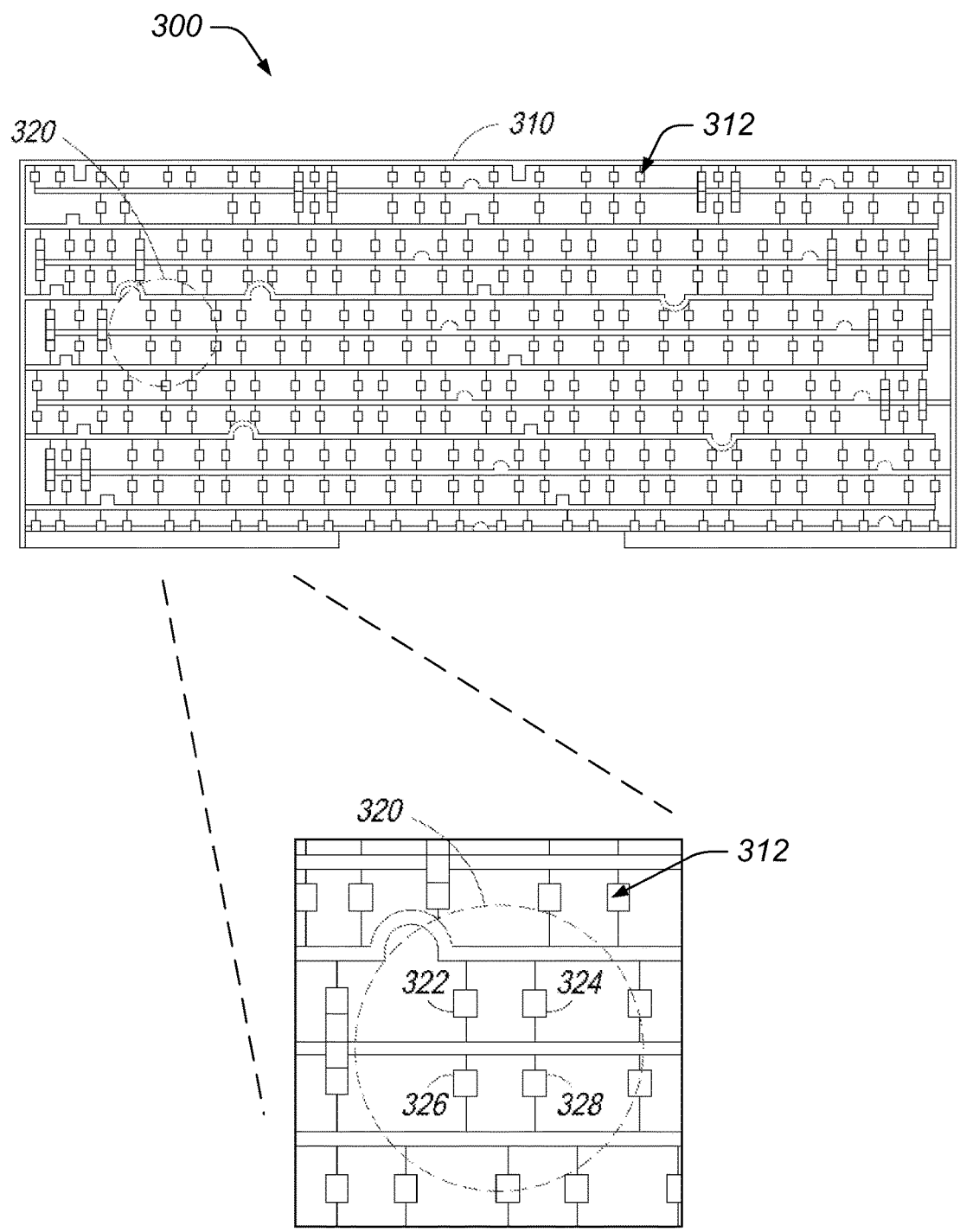
FIG. 3 is an illustration of an example lightplate, showing some detail of multiple groups of light-generating sources, according to an implementation.

FIG. 3 shows an example lightplate 300, according to one embodiment. The lightplate 300 can be connected into an existing LED backlighting controller and power source (not shown) of the keyboard assembly 100. The lightplate 300 has electrically conductive traces 310 to the light-generating sources 312 on the plate 300. In some implementations, the traces 310 include conductive inks deposited (e.g., printed, drawn, etc.) on the lightplate 300.

The traces 310 may be created using conventional conductive ink or other similar processes. Conductive inks may be classed as fired high solids systems or PTF polymer thick film systems that allow circuits to be drawn or printed on a variety of substrate materials such as polyester to paper. These types of materials usually contain conductive materials such as powdered or flaked silver and carbon like materials. While conductive inks can be an economical way to lay down a modern conductive traces 310, traditional industrial standards such as etching of conductive traces 310 may be used on relevant substrates.

FIG. 3 also shows a close-up image of an underkey portion 320 of the lightplate 300. Each underkey portion 320 is located on the lightplate 300 so as to be under a keytop 210 of a key 200—hence the term "underkey." The underkey portion 320, for example, includes the plurality of light-generating sources 312.

As can be seen in FIG. 3, the plurality of light-generating sources 312 of the underkey portion 320 is divided into multiple distinct groups (e.g. groups 322, 324, 326, and 328) of multiple light-generating sources 312. Each group is placed substantially underneath a keytop 210. Herein, the phrase "substantially underneath a keytop" means that at least one of the light-generating sources 312 of that group is located under (i.e., within) the footprint of the keytop 210. Of course, in other implementations, all of the light-generating sources 312 of the group may be within the footprint of the keytop 210.

In at least one implementation, each group of multiple light-generating sources 312 is printed and/or sprayed onto the lightplate 300 and conductive traces 310 link each group to power. Through these traces, the keyboard 100 can power and control the backlighting of the keys 200.

In some implementations, the new lightplate 300 may be a replacement (e.g., retrofit) for the conventional lightplate 270 in the stack-up of a conventional keyboard assembly layers (as shown in assembly 100). In this way, the new lightplate 300 falls below the backplate just like the conventional lightplate.

In another implementation, a new lightstrip (like the new lightplate 300) replaces the conventional edge-mounted and edge-lit LEDs of a conventional lightplate (like lightplate 270). With such an implementation, an edge-wrapped lightstrip is attached (or otherwise optically adjacent) to and around one or more edges of a conventional lightplate 270. The light from the lightstrip is directed inward into the conventional lightplate 270 and, more particularly, towards the specific light pipes in the conventional lightplate 270. Lens or prisms may be used to direct the light coming from the new lightstrip. The light beams directed towards the lightplate emanate from the portions of the new lightstrip that are wrapped around the plate.

Figure 4:
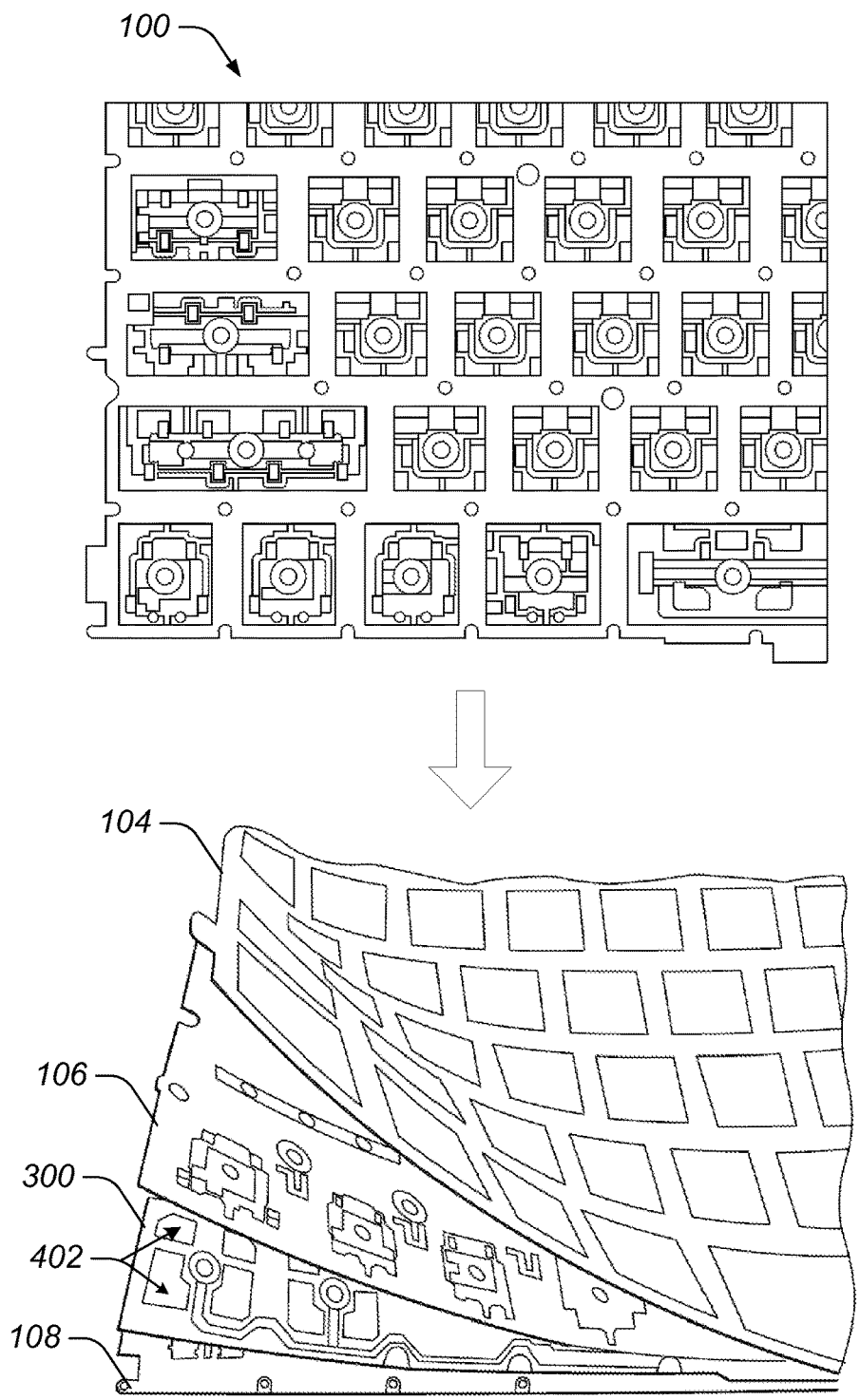
FIG. 4 is an illustration of an example layered keyboard assembly, showing some detail of the multiple layers, according to an implementation.

FIG. 4 shows an arrangement that is not a retrofit. As depicted, the keyboard assembly 100 layers may be reordered to use the lightplate 300 above the backplate. For example, in one arrangement as seen in FIG. 4, the order of the layers of the stack (from top to bottom) may include a key mechanics layer 104, a sensor layer 106, a lightplate layer 110 (i.e., lightplate 300), and a backplate layer 108. This layer order is described further in the section to follow, with regard to other implementations. In alternate implementations, the order may be changed further, with the lightplate 300 being at higher positions within the stack, as described below.

Other Implementations

Figure 5:
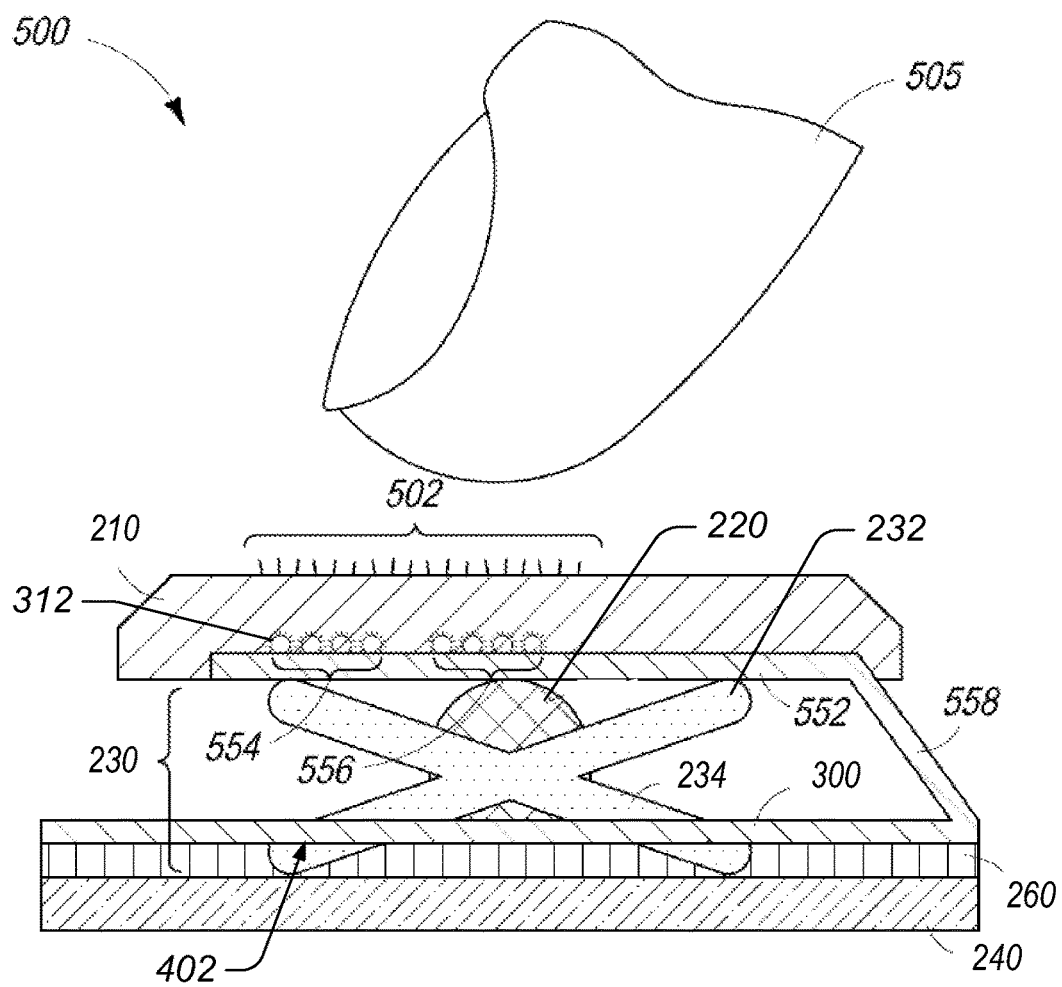
FIG. 5 is a schematic diagram illustrating a profile view of an example key assembly with illumination, according to an implementation.

Referring to FIGS. 4 and 5, since the lightplate 300 uses electrically conductive traces 310 rather than light guides, the lightplate 300 can accommodate holes 402 therethrough. For example, in an implementation, the lightplate 300 includes holes 402 that allow for at least a portion of the key mechanics layer 104 (e.g., scissors) to pass through when the keytop 210 is pressed (e.g., during a keypress of the key 200). This allows more flexibility in placement of the lightplate 300 within the keyboard stack 100, while maintaining consistent illumination to the keys 200. Thus, the lightplate 300 may be located above the backplate layer 108 or above the sensor layer 106. Also, the lightplate 300 may be part of the key mechanics layer 304 or the sensor layer 106, or even the key layer 102. Accordingly, the lightplate 300 may be positioned within the keyboard assembly to illuminate the plurality of keys 200 of the keyboard without increasing a total thickness of the keyboard assembly as without the lightplate 300. In other words, the addition of the lightplate 300 adds nothing to the thickness of the keyboard assembly 100.

In various implementations, the light-generating sources 312 are deposited (e.g., printed, sprayed, etc.) on one or more surfaces and/or layers in the keyboard stack. In the implementations, the electrically conductive traces 310 link the sources 312 to power and control systems. In one alternative implementation, the light-generating sources 312 are deposited on the backplate 240 to illuminate the key 200 and/or the keyboard assembly 100.

Example Backlighting of the Key Mechanics Layer

FIG. 5 illustrates a side elevation view of an example simplified key assembly 500 constructed in accordance with the technology described herein. More particularly, the example keyboard assembly 500 depicts implementations of the technology described herein with regard to a modified form of a key assembly 200, where light-generating sources 312 are above the backplate 240.

The components of the example key assembly 500 are not shown to scale. Also, they are not shown with typical or expected relative proportions to the size and thickness of the other components. Rather, the components are shown in an example order of a keyboard stack and with an example relationship to each other.

Stripped down to its essentials, the example key assembly 500 includes a keycap 210, a collapsible elastomeric plunger (i.e., "rubber dome") 220, a scissor-mechanism 230, a rigid backplate 240, a lightplate 300, and a sensor layer 260. The lightplate 300 includes an implementation of the light-generating sources 312 technology described herein.

The key mechanics layer 104 includes the rubber dome 220 and the scissor-mechanism 230. The key mechanics layer 104 also inherently includes portions of the structure under the keycap (i.e., keytop) 210. Those keycap 210 portions form part of the structures that support, connect, and/or interact with the rubber dome 220 and the scissor-mechanism 230 (or other types of resist-and-return structures and leveling structures). Thus, at least a portion of the keycap 210 may be considered part of the key mechanics layer 104. As used herein, references to something being integral with or "of" the key mechanics (or key mechanics layer 104) implies that the something is included with, part of, and/or directed connected to a resist-and-return structure 220, a leveling structure 230, and/or a keycap 210 portion that those structures support, connect, and/or interact therewith.

The rubber dome 220 provides a familiar snap-over feel to a user as her finger 505 presses the key 500 to engage the keyswitch sensor 260 of the sensor layer 106 under the keycap 210. The primary purpose for the scissor-mechanism 230 is to level the keycap 210 during the keypress.

The scissor mechanism 230 (as is typical) includes at least a pair of interlocking rigid (e.g., plastic or metal) blades (232, 234) that connect the keycap 210 to the backplate layer 108, base 240, and/or body of the keyboard 100. The interlocking blades 232, 234 move in a "scissor"-like fashion when the keycap 210 travels along a vertical path. As mentioned above, in some embodiments, the lightplate 300 may include one or more holes 402, and the lightplate may be positioned within or below the key mechanics layer 104. In one implementation, at least a portion of the blades 232, 234 passes through the holes 402 in the lightplate 300 when the keytop 210 is pressed.

As depicted in FIG. 5, in an embodiment, the sensor layer 260 sits on the backplate 240 and below the lightplate 300. As noted in the Background section, the purpose of the sensor layer 106 is to detect a keypress of a key 500. To that end, the sensor layer 106 has electronic circuitry to sense the downward pressing of the key 500 by the user's finger 505.

The most common type of sensor 260 utilizes a conductive or contact switch under each key. Other sensing technologies (such as capacitive and electrical resistance) may be employed.

In this example implementation, the lightplate 300 is shown above the backplate 240 and above the sensor layer 106. With other implementations, the arrangement of the keyboard stack 100 may vary. For example, the lightplate 300 may be below or integral with the sensor layer 108.

As depicted in FIG. 5, the main body of the lightplate 300 is largely positioned below the key mechanics layer 104 and above the sensor layer 260 and backplate 240. In an embodiment, a portion of each lightplate 300 is positioned integral with the keyboard mechanics layer 104 (or alternately above the keyboard mechanics layer 104).

In an embodiment, as shown in FIG. 5, the position of the lightplate 300 and the holes 402, allows at least a portion of the key mechanics 230 to move through the holes 402 during a keypress of the keytop 210. This allows the lightplate 300 to occupy a space that would otherwise be substantially vacant—and to provide illumination to the keys 500 without adding thickness to the keyboard assembly 100.

In one implementation, as shown in FIG. 5, a portion of the lightplate 300, referred to herein as a light flap (or tab) 552, extends from the main lightplate 300 and is positioned just above the moving parts of the key mechanics layer 104 (which are rubber dome 220 and the scissor-mechanism 230 in this example) and at the base of the keycap 210. In one implementation, the light flap 552 is positioned so that the flap 552 makes contact with the underside surface of the keytop 210). The light flap 552 includes a plurality of light-generating sources 312, which is shown in groups 554 and 556. For illustrative purpose only, the individual light-generating sources 312 are shown as incandescent light bulbs and not to scale. In other places in this document, the actual nature and approximate dimensions of example light-generating sources 312 contemplated for use with the technology are discussed.

In an implementation, the light flap 552 has a hinge 558 that connects the light flap 552 to the main body of the lightplate 300. The conductive traces 310 that link the plurality of light-generating sources 312 of the light flap 552 to its controller/power-source extend along the hinge 558 from the main body of the lightplate 300 to the light flap 552. In an embodiment, the conductive traces 310 are arranged to pass between or around the holes 402 in the lightplate 300.

In the example key assembly 500 of FIG. 5, the plurality of light-generating sources 312 are deposited on the lightplate 300 (between or around the holes 402) at a position that is substantially underneath an at least partially translucent key legend of the key 500. That is, at least part of the keytop is at least translucent. Alternatively, part of the keytop may be more than translucent. It may be transparent.

In this position, the plurality of light-generating sources 312 is configured to consistently illuminate the key legend of the key 500 from underneath the keytop 210. In one example, as shown in FIG. 5, the plurality of light-generating sources 312 is deposited on the light flap 552. The light emanating from the plurality of light-generating sources (such as those of groups 554 and 556) pass through a translucent or transparent material of a key legend 502 of the keycap 210 effectively backlighting the legend 502.

Indeed, this arrangement—of having the backlighting light sources 312 being so close to the key legend 502—is particularly desirable for allowing little or no light to leak out from around the keys 500. Also, since there are no obstacles between the light sources 312 and the legend 502, the lighting is more efficient and presumably less power is needed to accomplish the same lighting quality produced by conventional backlighting approaches.

In an embodiment, the lightplate 300 may be fabricated with cutouts for the light flaps 552. The flaps 552 are positioned under each keytop 210. During assembly of the keyboards 100, the light flaps 552 are extended from the lightplate 300, and positioned amongst, within, and/or above the key mechanics layer 104.

Other Implementations of Key Mechanics Layer

Figure 6:
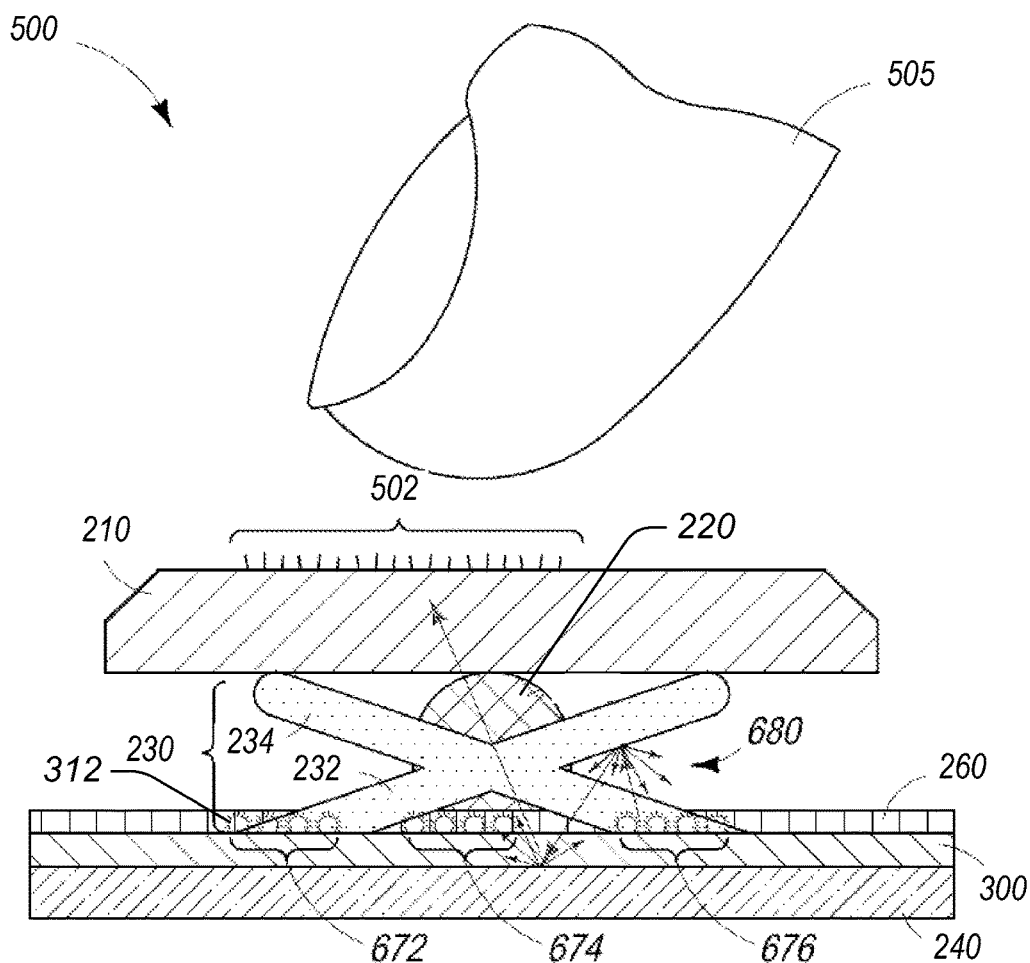
FIG. 6 is a schematic diagram illustrating a profile view of another example key assembly with illumination, according to another implementation.

In various implementations, the techniques and devices described herein may be implemented in ways other than as described above. For example, the lightplate 300 does not include a light flap 552 or hinge 558 in some implementations. In some of those implementations, as shown in FIG. 6, the light-generating sources 312 are deposited on the main body of the lightplate 300 below the key mechanics layer 104, instead of on a light flap 552. In such implementations, as discussed further below, the illumination from the light-generating sources 312 is directed up from the lightplate 300 to the underside of the keytop 210 to illuminate the key 500.

Since the discussed light-generating sources 312 are both extraordinarily tiny and capable of being deposited on any non-conductive surface, there are many other options available for placing these light-generating sources 312 in, around, and above the key mechanics layer 104. With each implementation, there is included a means to electrically couple the contemplated light-generating sources 312 with the power source (e.g., via the conductive traces 310 of the lightplate) and possibly a keyboard controller.

In one example implementation, the plurality of light-generating sources 312 may be deposited onto the key layer 102. For example, the plurality of light-generating sources 312 may be deposited on the top surface of the keycap 210. A clear coat or cover may protect the keycap-housed light-generating sources 312. Alternatively, the light-generating sources 312 may be deposited on the underside of the keycap 210. With the undermounted light-generating sources 312, there is presumptively sufficient light reflecting off the components below the keycap 210 to effectively backlight the key 500. If there is not, the reflective material may be added to increase the reflection or even to direct it. Alternatively still, the light-generating sources 312 may be in-mold decorated into the keycap 210.

In these example implementations, the keycap-housed light-generating sources 312 may be powered and controlled via a conductive connection 310 (e.g. wire or conductive trace) descending from the keycap 210 to the lightplate 300 below. Alternatively still, these keycap-housed light-generating sources 312 may be powered via induction, small battery, a capacitor, or ambient light (e.g., solar cell).

In another example implementation, the plurality of light-generating sources 312 may be deposited on the outer surface of the rubber dome 220. Alternatively, the plurality of light-generating sources 312 may be deposited on a surface of the blades 232, 234 of the scissor mechanism 230 or on other portions of the key mechanics layer 104.

In these example implementations, the dome-mounted or blade-mounted light-generating sources 312 may be powered and controlled via a conductive connection 310 (e.g. wire or conductive trace) descending to the lightplate 300 below. Alternatively still, these the dome-mounted or blade-mounted light-generating sources 312 may be powered via induction, small battery, a capacitor, or ambient light (e.g., solar cell).

Consistency of Underkey Illumination

The placement of the light diffusers for the conventional light guide 270 approach is limited by the diffusing technology and by the light-plate 270 real estate demanded by the light guides themselves. Because the light diffusers cannot be placed precisely enough and they fail to produce enough light, key legends are often lit inconsistently.

For example, in most keyboards, some of the keys include legends with multiple characters (e.g., "shift," "Ctrl," etc.), forming a multi-letter word (see FIG. 9, for example), or have multiple symbols or legends (e.g., the "7" key also has an "&" legend). However, with some backlighting techniques, the multi-character legends or multiple legends are backlit inconsistently (e.g., some of the characters are dimmer and some are brighter). When backlit with the techniques and devices described herein (i.e., the plurality of light-generating sources 312 is deposited on the lightplate 300 in multiple groups that are substantially underneath the multiple transparent or translucent key legends 502 of the key), the multiple characters and the multiple symbols or legends are lit consistently across the key 500. For example, the middle characters of a multi-character legend are equally as well lit as the characters at either end of the legend.

The backlighting techniques and devices described herein are able to consistently backlight key legends 502 because the placement of the light generating sources 312 under the keytop 210 can be precise. For example, the light-generating sources 312 can be deposited (e.g., printed) in a group (or in multiple groups) onto the lightplate 300 in a place that would be directly under the location (e.g., footprint) of the key legend 502.

In addition, the light-generating sources 312 are spread out over a small area under the key 500. Therefore, rather than having light coming from just one spot or point under the key 500, light can emanate from multiple locations under the key 500. Furthermore, the backlighting technology described herein can be significantly brighter than conventional approaches.

As used herein, the phrase "substantially underneath the key legend 502 of the key" includes at least one light-generating source 312 directly underneath (i.e., in the footprint) of the key legend 502 of the key 500 once the keyboard stack 100 is assembled.

Diffused Keyboard Backlighting from Underkey Light Sources

As noted above, the conventional lightplates 270 have diffusers (e.g., etched dots or patterns) under the keys 200 to catch the light of the light guide 270. The manner in which the diffusers redirect the light of the light guides 270 reflects and scatters the light of the light guide 270.

The light redirection and scattering is called diffuse reflection or light diffusion. Herein, it is simply called diffusion. Unlike specular reflection, diffusion is the reflection of light from a surface such that an incident ray is reflected at many angles. In contrast, specular reflection is the mirror-like reflection of light from a surface, in which light from a single incoming light ray is reflected into a single outgoing direction.

Diffused light is a soft light with neither the intensity nor the glare of direct light. It is scattered and comes from all directions. Thus, it seems to wrap around objects. It is softer and does not cast harsh shadows.

As its name implies, the light reflected by the diffusers of the conventional lightplate 270 technology is diffused. Thus, the light passing through the underside and around a key 200 is diffused. However, the technology described herein involves point light sources under a key 500. A typical point light source produces direct light. Because of its harsh nature, direct light is not always as desirable as diffuse light.

The light-generating sources 312 according to the techniques and devices described herein are extraordinarily small and each individual source 312 may be difficult to differentiate from others. These factors may reduce some of the harshness and glare of the typical direct light. However, there may be a desire to increase the overall diffusion of the light coming from the light-generating sources 312 according to the techniques and devices described herein.

FIG. 6 illustrates a side elevation view of the simplified key assembly 500, where the light from the light-generating sources may be diffused while illuminating the key legend 502 of the key 500. In the example implementation shown, the lightplate 300 is shown above the backplate 240 but below the keyswitch sensor 260. With other implementations, the arrangement of the keyboard stack 100 may vary. For example, the lightplate 300 may be integral with the keyswitch sensor 260 or above the keyswitch sensor 260. In other examples, the lightplate 300 may be integral with the keycap 210, part of the key mechanism 230, and/or sandwiched between the keycap 210 and the key mechanism 230.

As depicted in FIG. 6, the plurality of light-generating sources 312 is shown in groups 672, 674, and 676 on the lightplate 300. For illustrative purpose only, the individual light-generating sources are shown as incandescent light bulbs and not to scale. In other places in this document, the actual nature and approximate dimensions of example light-generating sources contemplated for use with the technology are discussed.

To promote diffusion of the light emanating from the plurality of light-generating sources 312 (which are shown in groups 672, 674, and 676), the plurality of light-generating sources 312 are placed under the infrastructure of the key mechanics 230. More precisely, the light-generating sources 312 are placed on the lightplate 300 so as to be in the footprint of the collapsible elastomeric plunger 220, the scissor-mechanism 232, 234, or other structures of the key mechanics 230. That is, the light-generating sources 312 are placed on the lightplate 300 in positions so that they are substantially directly underneath the collapsible elastomeric plunger 220, the scissor-mechanism 232, 234, or other structures of the key mechanics 230. For this context, "substantially directly underneath" these structures includes over half of the plurality of light-generating sources 312 of a group being actually directly underneath such structures once the keyboard 100 is assembled.

In alternate implementations, the light-generating sources 312 are deposited onto the structure of the collapsible elastomeric plunger 220, the scissor-mechanism 232, 234, or other structures of the key mechanics 230.

As depicted, example light ray 680 emanates from the group 676 of the light-generating sources and towards the underside of the keycap 210. Since the sources 312 are pointed towards the keycap 210, little to no light emanates from the sources 312 in a direction other than towards the underside of the keycap 210.

As shown, example light ray 680 is reflectively diffused off the blade 632. The depicted arrows indicate the light scatted off the blade 632. For the sake of simplicity of explanation, the paths of the scattered light will be understood to exist but will not be explored.

Following the now diffuse example light ray 680 after its reflection off the blade 632, it is similarly reflected in a diffused manner off the backplate 240 (or alternatively off the reflector substrate of the lightplate 300). Following the even more diffuse example light ray 680 after its reflection off backplate 240, the light ray 680 emerges from a presumably transparent portion of the keycap 210. Illuminated area 502 of the keycap 210 indicates the diffuse light ray 680 (among others) backlighting the key 500 and/or the key legend 502.

Integral with Sensor Layer

Figure 7:
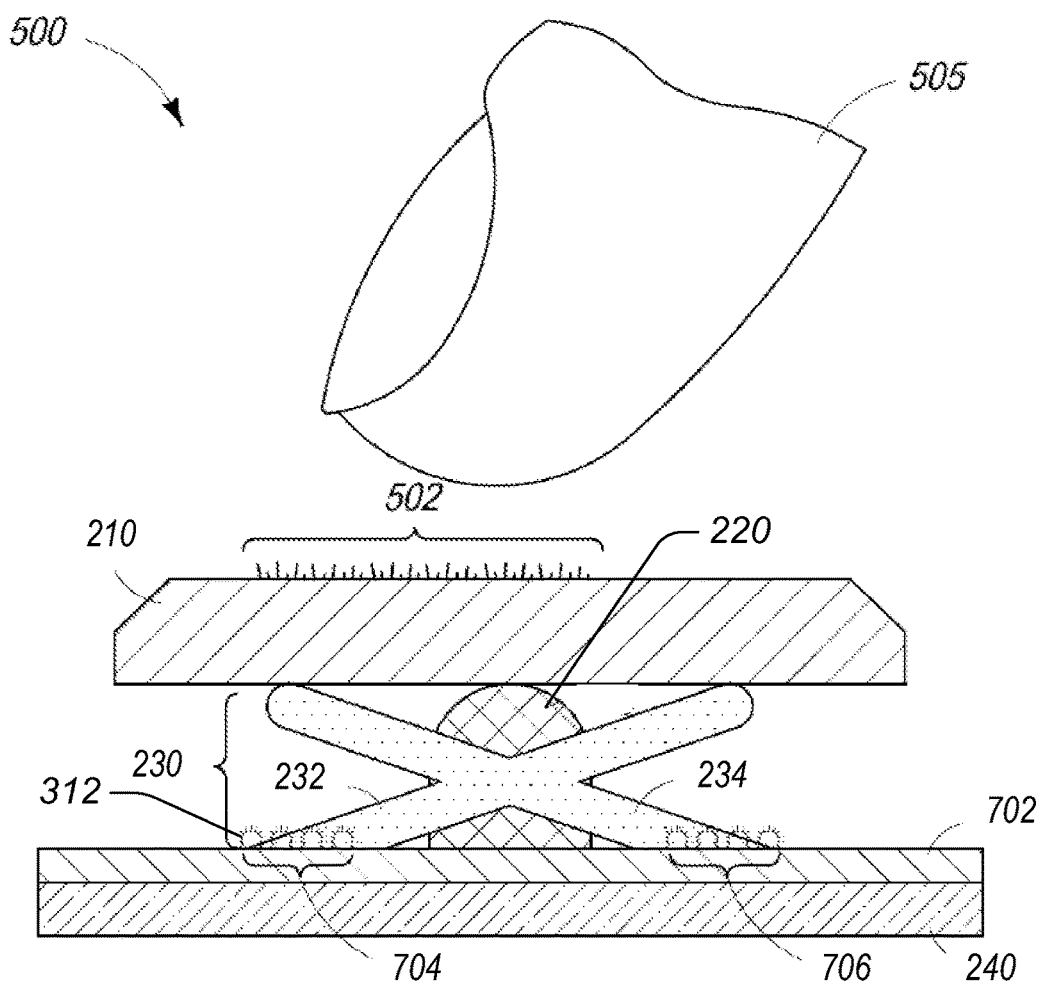
FIG. 7 is a schematic diagram illustrating a profile view of a further example key assembly with illumination, according to a further implementation.

In an implementation, as depicted in FIG. 7, the lightplate 300 and the sensor layer 106 are an integrated layer. For example, the light-generating sources 312 are deposited onto the sensor layer 106. As shown in FIG. 7, the sensor/light layer 702 includes a plurality of light-generating sources 312, which is shown in groups 704 and 706. For illustrative purpose only, the individual light-generating sources are shown as incandescent light bulbs and not to scale. In other places in this document, the actual nature and approximate dimensions of example light-generating sources contemplated for use with the technology are discussed. In an implementation, the electrically conductive trace(s) 310 providing connectivity from a power source to the light-generating sources 312 are also deposited onto the sensor layer 106.

In this example implementation, the lightplate 300 is shown above the backplate 240 and as part of the sensor layer 106 with the sensors 260, forming a multi-functional layer. In an embodiment, the multi-functional layer integrating the lightplate 300 with the sensor layer 106 can replace the sensor layer 106 of an existing keyboard assembly 100, providing keypress detection and key illumination to the existing keyboard assembly 100. With other implementations, the arrangement of the keyboard stack 100 may vary. For example, the lightplate may be above the sensor layer 106. In other examples, the lightplate 300 may be integral with the keycaps 210, part of the key mechanisms 220 and 230, and/or sandwiched between the keycap 210 and the key mechanism 220 and 230, forming other multi-functional layers. In various implementations, the electrically conductive trace(s) 310 are also deposited onto the multi-functional layer, providing connectivity from a power source to the light-generating sources 312.

As noted in the Background section, the purpose of the sensor layer 106 is to detect a keypress. To that end, it has electronic circuitry to sense the downward pressing of the key 500 by the user's finger 505. The most common type of sensor 260 utilizes a conductive or contact switch under each key 500. Other sensing technologies (such as capacitive and electrical resistance) may be employed. The sensor layer 106 is also called the "keyswitch" layer or the "sensor membrane" layer.

A conventional keyboard 100 typically utilizes a sensor membrane layer 106 of at least three substrates and one or more conductive-based switches to detect key 500 depressions. A first substrate and second substrate each have contact switch circuitry. The first and second substrates are separated by a third non-conductive substrate disposed therebetween. The non-conductive substrate between the two conductive substrates has a hole therethrough that allows the underkey contacts of each conductive substrate to trampoline together upon a keypress. This action closes a switch and indicates a keypress.

In the example key assembly 500, the plurality of light-generating sources 312 may be deposited on any or all of the three substrates. Regardless of which substrate on which the sources are deposited, the conductive traces that link the sources 312 back to a controller and power source may be on, under, or part of any substrate. That is, the conductive traces may be on the same surface of the same substrate as where the light-generating sources 312 are deposited or alternatively on a completely different substrate—presuming that the circuits to the sources 312 are connected through the substrates.

The sources 312 may be deposited on the top conductive substrate. In this way, the top substrate is acting in the same way as the lightplate 300 discussed above. Alternatively, the light-generating sources 312 may be deposited on the bottom conductive substrate. Alternatively still, the light-generating sources 312 may be deposited on the middle substrate. In more alternatively, the light-generating sources 312 may be deposited on an additional substrate of the sensor/light layer 702.

When the light-generating sources 312 are in or under the sensor/light layer 702, the substrates above the sources 312 (or at least a portion thereof) are transparent and/or translucent. In this way, light from the sources 312 may travel through the substrates above the sources. In some implementations, the substrates above the sources 312 (or at least a portion thereof) are frosted or etched in a manner to diffuse the light emanating from the sources 312.

One of the advantages of a combination of the lightplate 300 and the sensor layer 106 is decreasing the overall thickness of the keyboard assembly 100. These implementations effectively eliminate the lightplate 300 from the keyboard stack 100. A conventional laptop keyboard 100 is about 3 mm to 6 mm thick. A conventional lightplate 270 is about 0.25-0.5 mm thick. This can result in reducing the thickness of the keyboard stack 100 to 2.5-5.75 mm. In the world of ever shrinking electronic devices, this can represent a significant improvement in thinness.

Separate Control of Light-Generating Sources

Conventionally, the light from the lightplate 270 must make its way past many obstructions to arrive under the keycap 210 and to ultimately illuminate a transparent or translucent legend 502 (e.g., "A" or "Shift") of a key 200. The obstructions include the backplate 240, sensor layer 106, keyboard mechanics (such as rubber dome 220 and scissor-mechanism 230, and other structures under the keycap 210 itself).

Because the conventional lightplate 270 is placed far back under the key 200, the lightplate 270 illuminates both the legend 520 of the key 200 and exposed volume around the key 200. The illumination of the exposed volume causes a "halo" effect around the key 200. Hence, this is often called halo illumination or simply a halo. With conventional approaches, the legend 520 and halo illumination could not be controlled separately.

In an implementation, separately addressable groups of light-generating sources 312 may be placed more directly under the area where separately controlled illumination is desired. Indeed, a separately addressable group of light-generating sources 312 may be placed directly under the transparent or translucent legend 502 of a key. In one implementation, the group may be placed with a light dam or light barrier surrounding it so that light from the light-generating sources 312 is limited to illuminating a desired key legend 502 of a desired key 500 and to inhibit the light from leaking to other key legends or to other keys.

Similarly, another separately addressable group(s) of light-generating sources 312 may be placed around the periphery of the key 500. The group(s) may be placed on the underside of the keytop 210 (along is periphery) or directly under the periphery of the key 500. Accordingly, the groups providing illumination of the key legend 502 may be addressed and controlled separately from the groups providing illumination of the halo around the key 500. For example, the key legend and the halo may be illuminated separately or simultaneously, as desired, by controlling the illumination of the two groups (or two sets of groups) independently.

Figure 8:
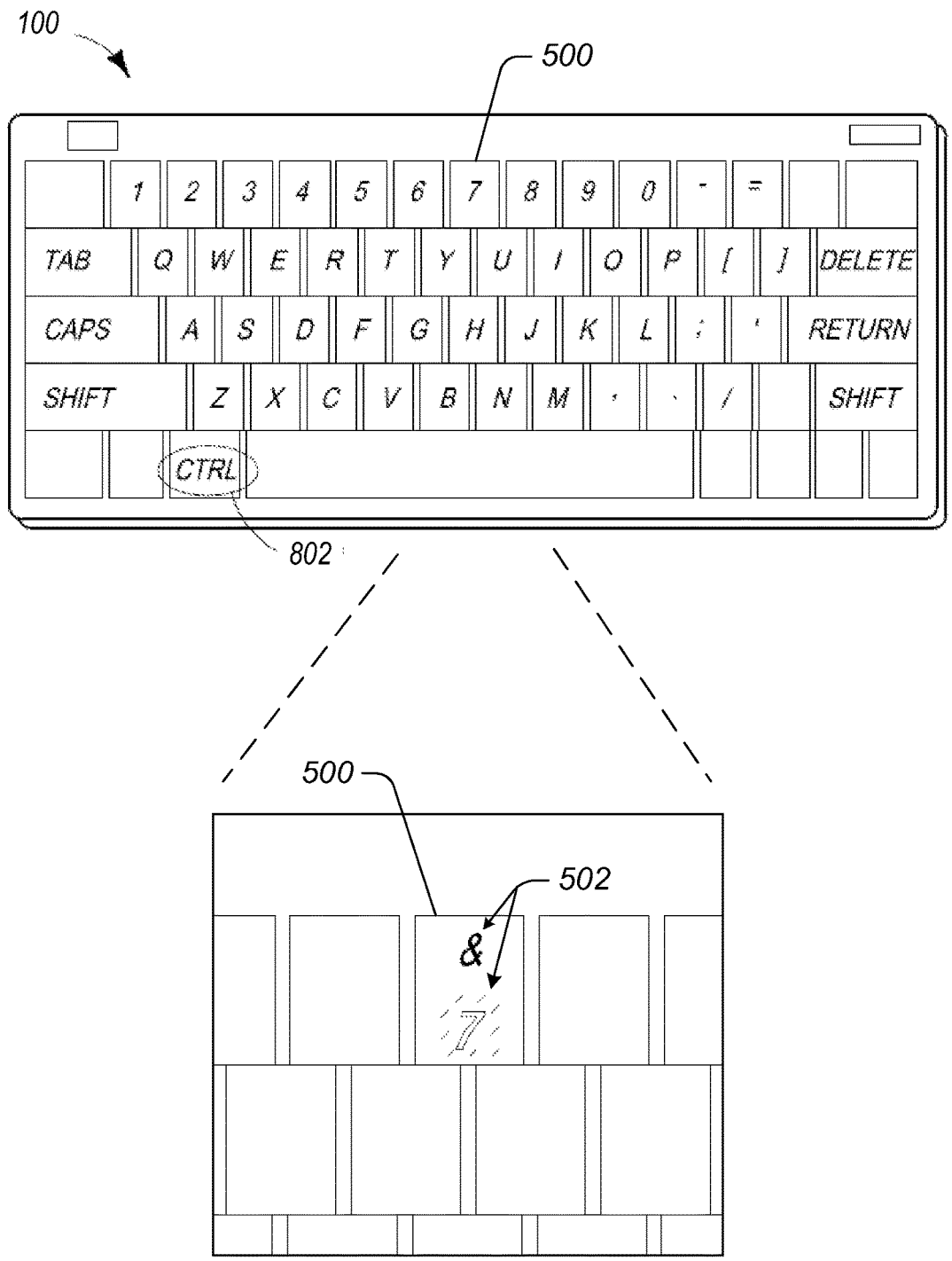
FIG. 8 is an illustration of an example keyboard with separate key legend illumination, according to an implementation.

Further, as shown in FIG. 8, some keys 500 on a keyboard 100 have multiple different legends. For example, the "7" key also has the "&." Typically, the alternative function of a key (e.g., "&") is accessed by pressing an additional key 802, such as the SHIFT key, Ctrl key, or a function or command key. Accordingly, a single group of light-generating sources 312 is separately controlled based on a keypress of one or more predetermined keys or key combinations.

Because a conventional lightplate 270 is placed far back under the key, the lightplate 270 illuminates both legends of the key. With conventional approaches, the illumination of different legends 502 typically cannot be controlled separately.

In an implementation, a key 500 includes multiple transparent or translucent key legends 502, and a plurality of light-generating sources 312 is deposited on the lightplate 300 in multiple groups that are substantially underneath the multiple transparent or translucent key legends 502 of the key 500. The multiple groups of light-generating sources 312 are separately addressable and separately controlled to illuminate each of the transparent or translucent key legends 502 separately and individually, based on a keypress of one or more predetermined keys or key combinations.

For example, referring to FIG. 8, separately addressable groups of light-generating sources 312 may be placed more directly under the area where separately controlled illumination is desired. Indeed, a separately addressable group of light-generating sources 312 may be placed directly under each of the transparent or translucent legends 502 of a key (e.g., "7" and "&"), and the illumination of each legend may be separately controlled. For example, the "7" can be illuminated when the additional key 802 (e.g., SHIFT key) is not pressed and the "&" can be illuminated when the additional key 802 is pressed. Each group of light-generating sources 312 may be placed with a light dam or barrier surrounding it so that little to no light leaks out around the key and to other legends.

In alternate examples, the "function" keys may be illuminated when the "Alt" or "Fn" key is pressed, alternate legends (either numbers or functions) may be illuminated on the number key pad based on whether the "num lock" key is pressed, and so forth.

Additionally, a conventional lightplate 270 of a keyboard 100 is either on or off. The illumination of portions of the lightplate 270 is not addressable and not controllable.

Figure 9:
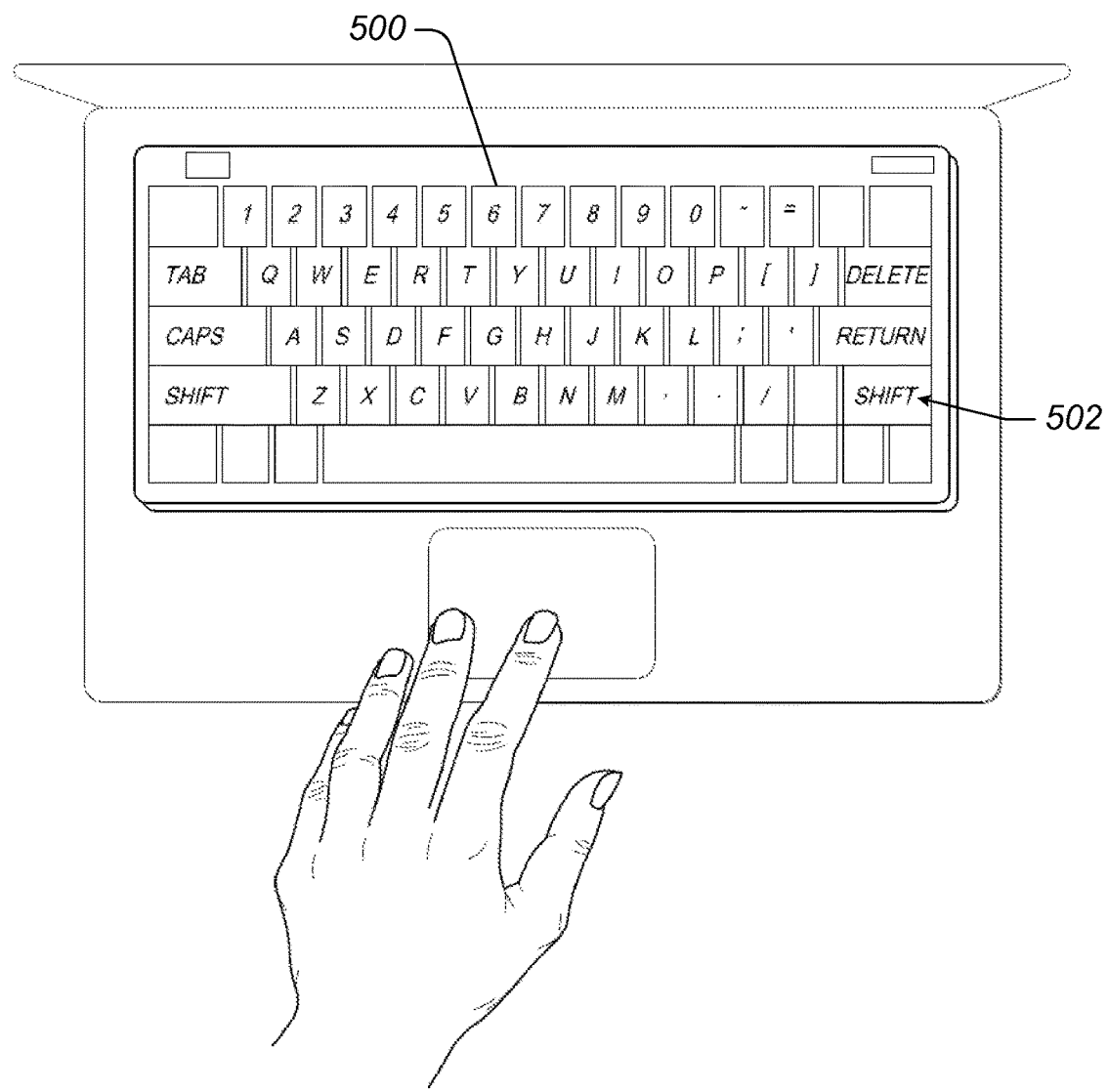
FIG. 9 is an illustration of an example device having a keyboard with separate key illumination, according to an implementation.
Figure 10:
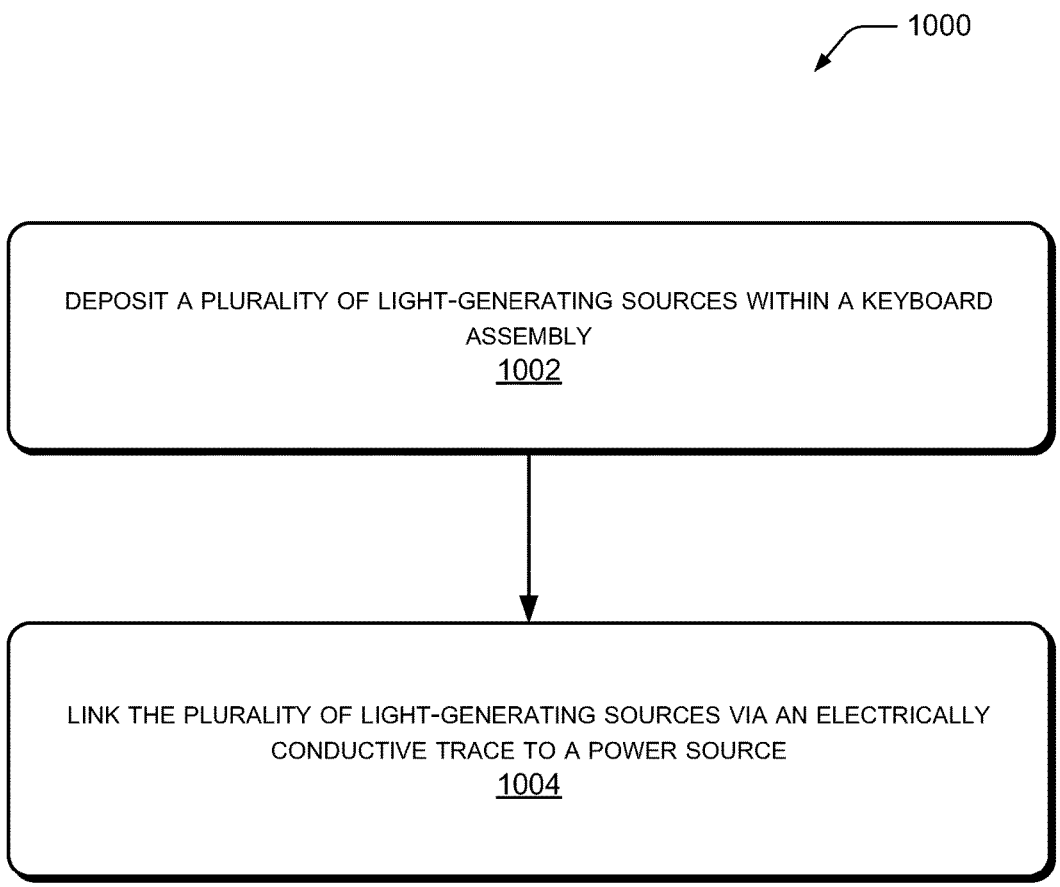
FIGS. 10-13 are flowcharts illustrating example processes in accordance with one or more implementations described herein.
Figure 11:
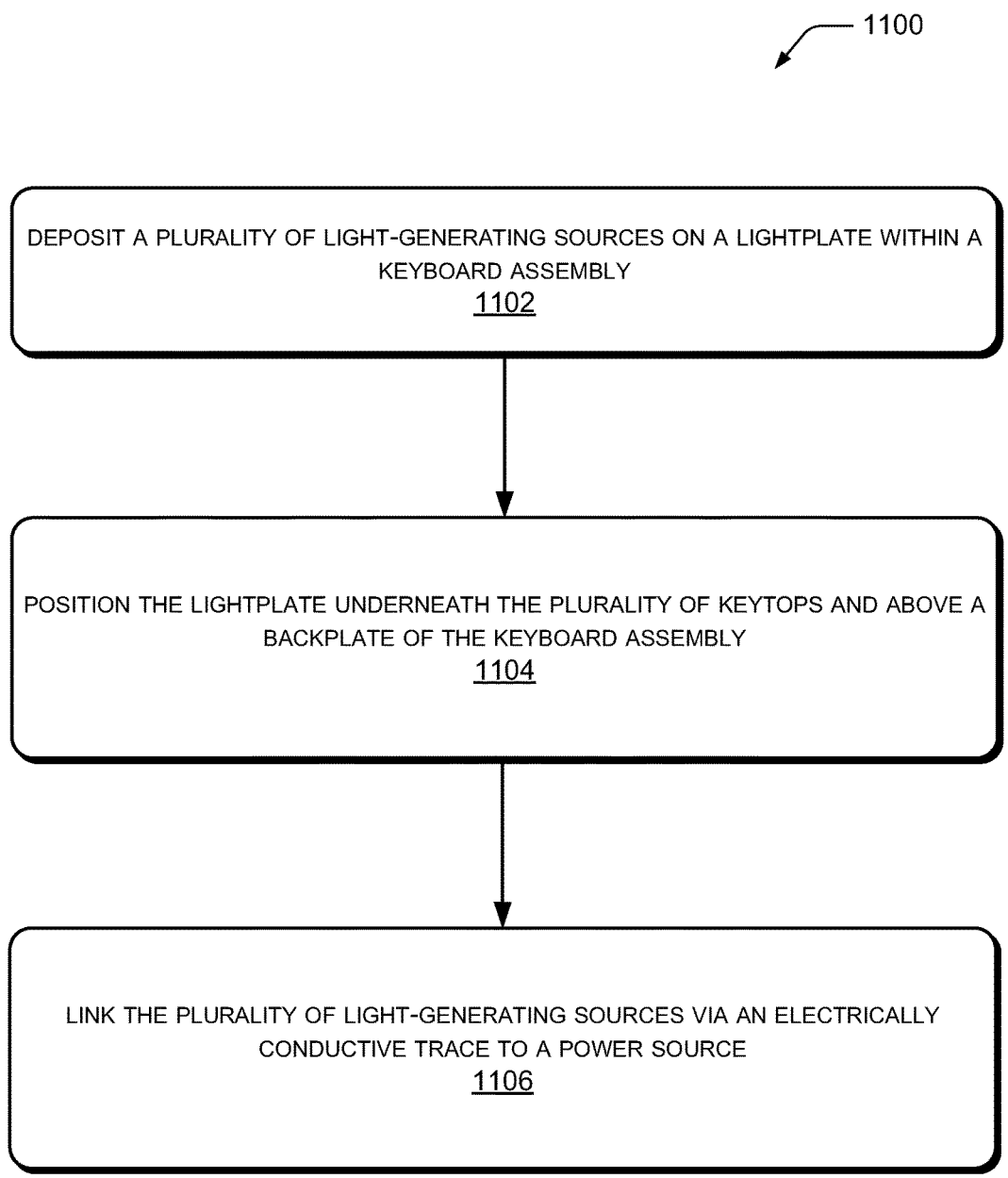
Figure 12:
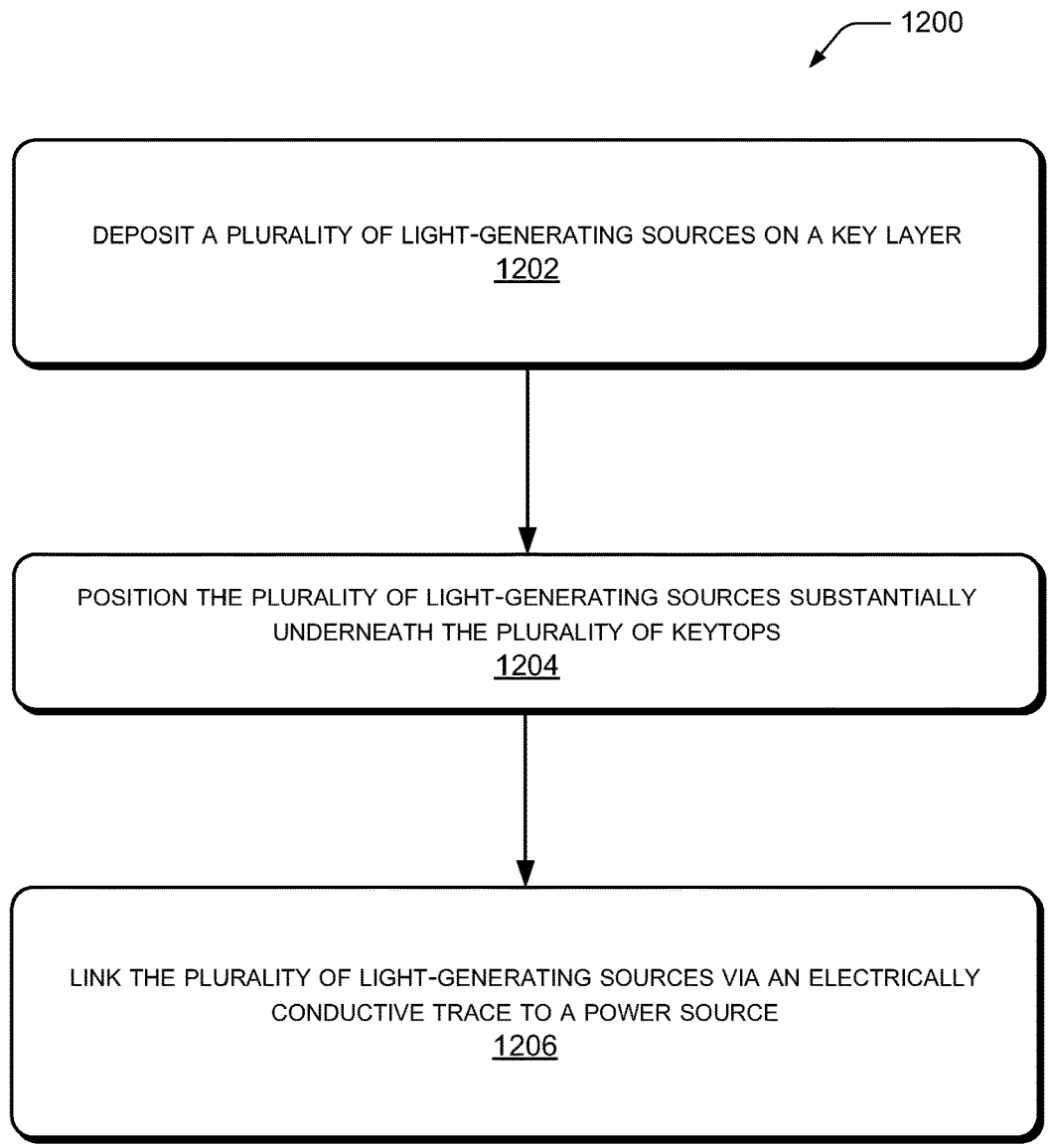
Figure 13:
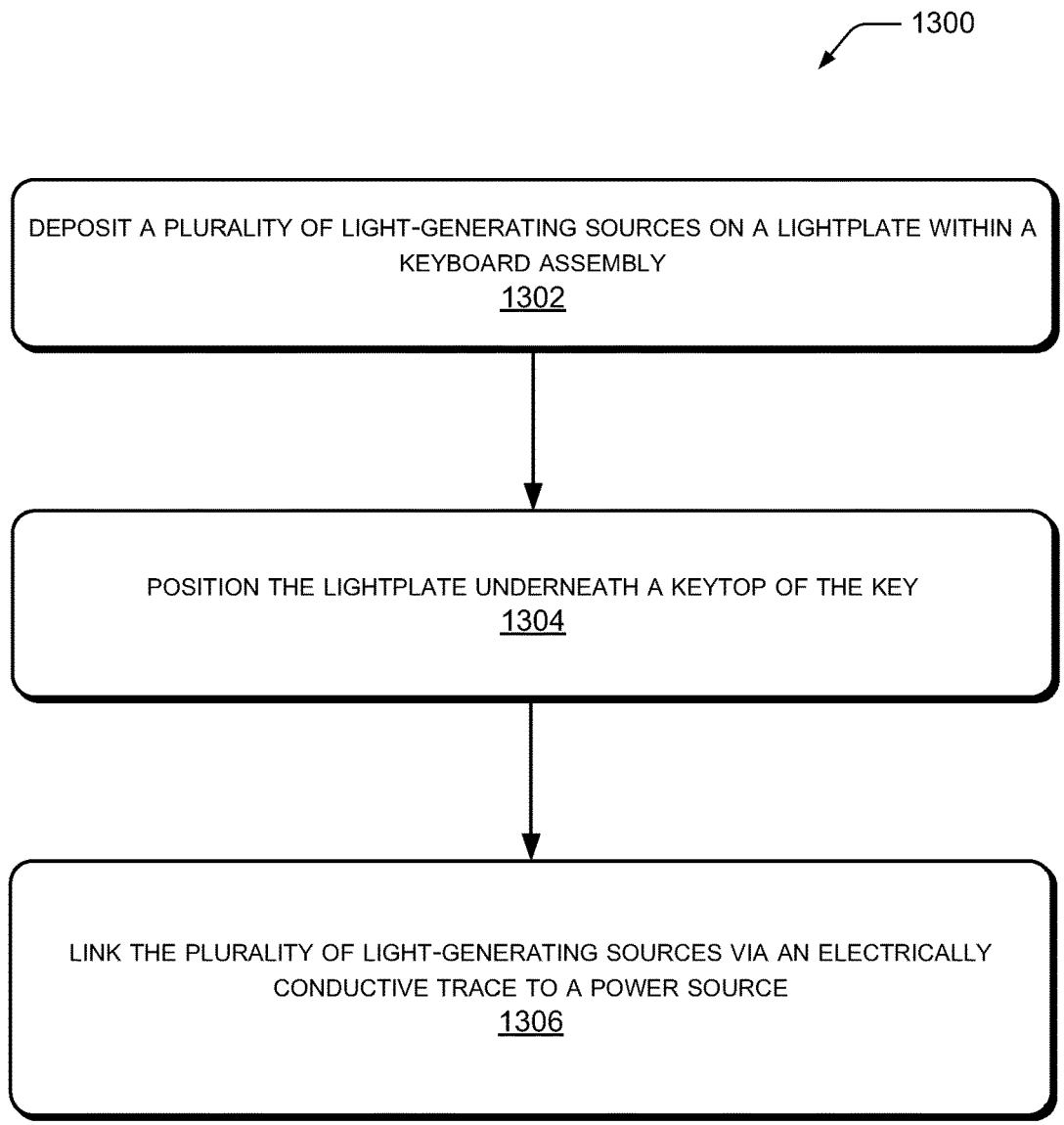

Referring to FIG. 9, in an implementation, separately addressable light-generating sources 312 may be distributed under the keys 500 of the keyboard 100, such that individual keys 500 or key legends 502 can be illuminated individually. Consequently, the light under the keyboard 100 might perform various dynamic effects based upon certain triggers.

For example, such dynamic effects can include: randomly illuminating or flashing a sequence of keys 500 and/or key legends 502, rolling on or off illumination of a sequence of keys 500 and/or key legends 502 (from bottom to top of keyboard 100 or vice versa or from side to side of the keyboard 100, or other pattern); flashing or blinking of all or part of the keyboard 100 or sets of keys 500 and/or key legends 502, dynamically illuminating or flashing a set or a sequence of keys 500 and/or key legends 502 according to audible tones, or the like.

Additionally, the dynamic effects may include temporarily illuminating one or more individual keys 500 and/or key legends 502. This might occur, for example, when the user has a limited number of acceptable keystrokes, for example, the group of keys 500 that the user may press may blink, and so forth.

Some examples of triggers might be with respect to a device including the keyboard assembly 100 or an application running on the device. For example, the triggers may include powering up the device, opening the device, receiving notification of a status of an application of the device, receiving a message or mail at the device, having a limited selection of keystrokes available at the device, and so forth. In an embodiment, a different trigger causes a different dynamic light effect to be performed. In some embodiments, the dynamic light effects may augment or replace audible notifications made by the device to alert a user.

Representative Processes

FIGS. 10-13 are flow diagrams illustrating example processes (1000, 1100, 1200, 1300) for illuminating a keyboard (such as keyboard assembly 100, for example), according to implementations. The processes are described with reference to FIGS. 1-9.

The order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable materials, or combinations thereof, without departing from the scope of the subject matter described herein.

According to process 1000, at block 1002, the process includes depositing a plurality of light-generating sources (such as light-generating sources 312, for example) within the keyboard assembly. In an implementation, the keyboard assembly includes at least one key (such as key 200 or 500, for example) positioned on a keyboard (such as such as key layer 102, for example), and the plurality of light-generating sources is deposited substantially underneath a keytop (such as keytop 210, for example) of the key.

At block 1002, the process includes linking the plurality of light-generating sources via an electrically conductive (such as conductive trace 310, for example) trace to a power source. In an implementation, the plurality of light-generating sources illuminate the at least one key from underneath the keytop when the power supply supplies power to the electrically conductive trace.

In an implementation, the process includes depositing the plurality of light-generating sources underneath the keytop and within a footprint of the keytop. For example, the process may include placing the plurality of light-generating sources into multiple distinct groups of multiple light-generating sources with each group placed substantially underneath the keytop.

In one embodiment, the process includes printing and/or spraying a liquid or gel into several distinct groups within the keyboard assembly, the liquid or gel having the plurality of light-generating sources suspended therein. In one embodiment the plurality of light-generating sources includes light-emitting semiconductors, such as miniature LEDs.

In an implementation, the process includes replacing a keyboard illumination source within a keyboard assembly with the plurality of light-generating sources to illuminate the key(s) of the keyboard.

In another implementation, the process includes depositing the plurality of light-generating sources onto a lightplate (such as such as lightplate 300, for example) and locating the lightplate within the keyboard assembly to illuminate the at least one key. In an implementation, the lightplate is positioned, such that at least a portion of the plurality of light-generating sources is located underneath the keytop of the at least one key and within the footprint of the keytop.

According to process 1100, at block 1102, the process includes depositing the plurality of light-generating sources on the lightplate within the keyboard assembly, where the keyboard assembly includes a plurality of keytops. At block 1104, the process includes positioning the lightplate underneath the plurality of keytops and above a backplate (such as backplate 240, for example) of the keyboard assembly. In an implementation, the plurality of light-generating sources is disposed substantially underneath the plurality of keytops.

At block 1106, the process includes linking the plurality of light-generating sources via an electrically conductive trace to a power source, the plurality of light-generating sources illuminating the plurality of keys from underneath the plurality of keys when the power supply supplies power to the electrically conductive trace.

In an implementation, the process includes positioning the lightplate underneath the plurality of keytops such that a majority portion of the plurality of light-generating sources is disposed within a footprint of the plurality of keytops.

In one embodiment, the process includes printing and/or spraying a liquid or gel onto the lightplate, where the liquid or gel has the plurality of light-generating sources suspended therein.

In an implementation, the process includes replacing a pre-existing keyboard illumination source within the keyboard assembly with the lightplate to illuminate the plurality of keys of the keyboard.

In various implementations, the process includes positioning the lightplate within the keyboard assembly to illuminate the plurality of keys of the keyboard without increasing a total thickness of the keyboard assembly as without the lightplate. For example, the addition of the lightplate does not add to the thickness dimension of the keyboard assembly.

In one example, the plurality of light-generating sources includes light-emitting semiconductors that have a diameter between about 20 to 50 microns and a height between about 5 to 20 microns.

According to process 1200, at block 1202, the process includes depositing the plurality of light-generating sources on a key layer (such as key layer 102, for example), a key mechanics layer (such as key mechanics layer 104, for example), or a sensor layer (such as sensor layer 106, for example) of the keyboard assembly, or a combination thereof. In the process, the keyboard assembly includes a plurality of keytops.

At block 1204, the process includes positioning the plurality of light-generating sources substantially underneath the plurality of keytops. At block 1206, the process includes linking the plurality of light-generating sources via an electrically conductive trace to a power source, where the plurality of light-generating sources illuminate the plurality of keys from underneath the plurality of keytops when the power supply supplies power to the electrically conductive trace.

In an implementation, the process includes depositing at least a portion of the plurality of light-generating sources onto the backplate of the keyboard assembly to illuminate the plurality of keys and/or the keyboard assembly.

In one implementation, the process includes depositing the plurality of light-generating sources onto a topside and/or an underside of one or more of the plurality of keytops to illuminate the plurality of keys.

In another implementation, the process includes depositing the plurality of light-generating sources onto a keypress mechanism (such as keypress mechanism 220 or 230, for example) of the key mechanics layer to illuminate the plurality of keys. For example, in an embodiment, the process includes depositing the plurality of light-generating sources such that the plurality of light-generating sources illuminates the plurality of keys via light emanating from the plurality of light-generating sources and reflectively diffused by the keypress mechanism.

In an implementation, the process includes depositing the plurality of light-generating sources and the electrically conductive trace onto the sensor layer to illuminate the plurality of keys. In an embodiment, the depositing includes printing or spraying a liquid or gel onto the at least one of the key layer, the key mechanics layer, the sensor layer, or a combination thereof, where the liquid or gel has the plurality of light-generating sources suspended therein.

According to process 1300, at block 1302, the process includes depositing a plurality of light-generating sources onto the lightplate within the keyboard assembly, the keyboard assembly including a key. At block 1304, the process includes positioning the lightplate underneath a keytop of the key, the plurality of light-generating sources disposed substantially underneath an at least partially translucent key legend of the key At block 1306, the process includes linking the plurality of light-generating sources via an electrically conductive trace to a power source, where the plurality of light-generating sources illuminate the key legend of the key from underneath the keytop when the power supply supplies power to the electrically conductive trace.

In an implementation, the process includes spraying and/or printing a liquid or gel onto the lightplate, the liquid or gel having the plurality of light-generating sources suspended therein.

In an embodiment, the process includes positioning the lightplate so that the lightplate makes contact with an underside surface of the keytop.

In another embodiment, the process includes positioning the lightplate so that the key legend is illuminated by a first group of light-generating sources and the periphery of the key is illuminated by a second group of light-generating sources, either separately or simultaneously. In an implementation, the process further includes controlling the illumination of the first group and the second group independently.

In one implementation, the process includes confining illumination of the plurality of light-generating sources to the key legend of the key and shielding the illumination of the plurality of light-generating sources from illuminating other legends and/or other keys.

In alternate implementations, other techniques may be included in the processes 1000, 1100, 1200, and 1300 in various combinations, and remain within the scope of the disclosure.

Light-Generating Sources

Conventionally, the smallest produced surface-mount LEDs are about 1.0 mm long by 0.8 mm wide and 0.2 mm thick. An example of a light-generating component 312 that is contemplated to be used with the technology described herein is described in U.S. Pat. No. 8,415,879, which is titled "Diode for a Printable Composition." These semi-conductor light-generating sources 312 are called "printable light-emitting diodes" or pLEDs herein.

Each printable light-emitting diode has a cross-section with a maximum length of 3 to 50 microns. Indeed, in some implementations, the light-generating component 312 has a cross-section with a maximum length of 15 to 20 microns. This is about thirty to fifty times smaller than the smallest conventional surface-mount LEDs available.

Using the pLEDs, each group of light-generating sources 312 (e.g., group 322) contains about two-thousand sources 312 in some implementations. In other implementations, a group may contain as much as five-thousand sources 312.

Of course, other implementations may use different technology for the light-generating sources 312 that may be deposited on a thin layer of material (e.g., 0.07 to 0.25 mm thick) underneath the keytops 210 and in an electrically conductive manner. For example, a hybrid of organic light-emitting diodes (OLEDs) with inorganic quantum dots may be an effective light-generating source 312 for the technology described herein.

Of course, other suitable light-generating sources may be used with implementations discussed herein and otherwise contemplated. In some implementations, a suitable light-generating source is smaller than 1.0 mm long by 0.8 mm wide and 0.2 mm thick and is larger than includes light-emitting semiconductors that each has a cross-section with a maximum length of 3 to 50 microns.

For external factors—such as existing contracts, particular illumination requirements, etc.—a keyboard 100 may be constructed that is backlit using a combination of conventional backlighting technologies (e.g., light guides, conventional LEDs, etc.) that is not printed or sprayed onto the lightplate (e.g., surface mount components, etc.) and the deposited light-generated sources 312 discussed herein. The conventional LEDs may be, for example, standard or surface mount LEDs, or the like.

Deposition of Light-Generating Sources

Implementations of the technology described herein that use the printable light-emitting diodes involve a disposition (e.g., printing, spraying, etc.) of printable light-emitting diodes that are suspended in a liquid or gel (e.g., ink).

The process of placing the light-generating sources 312 that are suspended in a liquid or gel on the lightplate is called "liquid deposition" herein. The liquid deposition may be accomplished by printing, spraying, or other such application processes. Indeed, the liquid deposition may be accomplished on a conventional printing press, screen press, ink jet printing, or other printing technology.

Deposition, as used herein, of light-generating sources involves the placement of such sources on a surface and in such a manner so that it is or can be linked electronically to a power source. Disposition does not include surface mounting as is accomplished with conventional LEDs. Rather, deposition herein includes, for example, liquid deposition, printing, spraying, lithography, electrophotography, ejection, squirting, shooting, electrophoresis, electroplating, and the like onto a surface.

Of course, other implementations may use different technology for the light-generating sources 312 that may be deposited on a thin layer of material (e.g., 0.07 to 0.25 mm thick), such as a thin film, underneath the keys and in an electrically conductive manner.

Additional and Alternative Implementation Notes

The discussion herein refers to keys and keytops as though each one was a separate unit from the other such items. Alternative implementations are contemplated where the individual keys (and thus keytops) are part of a integrated or contiguous material that covers the keyboard assembly.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The techniques described with respect to the various devices disclosed may be implemented as one or more methods or processes for backlighting a key 500 and/or a key legend 502. These processes can be considered as a collection of steps in a logical flow, which represents a sequence of operations that can be implemented in mechanics alone or a combination with hardware, software, and/or firmware. In the context of software/firmware, the execution of the instructions on the medium may cause performance of the operations described herein. For example, one or more computer-readable media with processor-executable instructions stored thereon which when executed by one or more processors may cause performance of operations described herein.

Note that the order in which the processes are described is not intended to be construed as a limitation, and any number of the described process steps can be combined in any order to implement the processes or an alternate process. Additionally, individual steps may be deleted from the processes without departing from the spirit and scope of the subject matter described herein.

Other Ways of the Describing Implementations

Below is a listing of different ways to describe the implementations introduced herein:

The subject matter of Example 1 can optionally include an apparatus comprising at least one key positioned on the apparatus; and a plurality of light-generating sources positioned substantially underneath a keytop of the at least one key and configured to illuminate the at least one key from underneath the keytop, at least two of the light-generating sources of the plurality of light-generating sources being within a footprint of the keytop.

The subject matter of any one of the above examples, starting with an including Example 1 can optionally include the plurality of light-generating sources includes light-emitting semiconductors.

The subject matter of any one of the above examples, starting with and including Example 1, can optionally include the plurality of light-generating sources includes light-emitting components that each has a cross-section with a maximum length of 15 to 20 microns.

The subject matter of any of the above examples, starting with and including Example [00166], can optionally include the plurality of light-generating sources includes light-emitting components that each has a cross-section with a maximum length of 3 to 50 microns.

The subject matter of any of the above examples, starting with and including Example [00166], can optionally include the plurality of light-generating sources is arranged into multiple distinct groups of multiple light-generating sources, each group disposed substantially underneath the keytop.

The subject matter of any of the above examples, starting with and including Example [00166], can optionally include the plurality of light-generating sources is deposited onto a lightplate located within the apparatus, underneath the at least one key.

The subject matter of any of the above examples, starting with and including Example [00166], can optionally include the plurality of light-generating sources is printed and/or sprayed onto the lightplate.

The subject matter of Example 2 can optionally include depositing a plurality of light-generating sources within a keyboard assembly, the keyboard assembly including at least one key positioned on a keyboard, and the plurality of light-generating sources deposited substantially underneath a keytop of the at least one key; and linking the plurality of light-generating sources via an electrically conductive trace to a power source, wherein the plurality of light-generating sources illuminate the at least one key from underneath the keytop when the power supply supplies power to the electrically conductive trace.

The subject matter of any of the above examples, starting with and including Example 2, can optionally include further comprising depositing the plurality of light-generating sources underneath the keytop and within a footprint of the keytop.

The subject matter of any of the above examples, starting with and including Example 2, can optionally include placing the plurality of light-generating sources into multiple distinct groups of multiple light-generating sources with each group placed substantially underneath the keytop.

The subject matter of any of the above examples, starting with and including Example 2, can optionally include printing and/or spraying a liquid or gel into several distinct groups within the keyboard assembly, the liquid or gel having the plurality of light-generating sources suspended therein.

The subject matter of any of the above examples, starting with and including Example 2, can optionally include replacing a keyboard illumination source within a keyboard assembly with the plurality of light-generating sources to illuminate the at least one key of the keyboard.

The subject matter of any of the above examples, starting with and including Example 2, can optionally include depositing the plurality of light-generating sources onto a lightplate; and locating the lightplate within the keyboard assembly to illuminate the at least one key, such that at least a portion of the plurality of light-generating sources is located underneath the keytop of the at least one key and within the footprint of the keytop.

The subject matter of any of the above examples, starting with and including Example 2, can optionally include the plurality of light-generating sources includes light-emitting semiconductors.

The subject matter of Example 3 can optionally include a backlighting apparatus comprising a lightplate comprised of a thin film and located within a keyboard assembly; a plurality of light-generating sources deposited on the lightplate at a position that is substantially underneath a keytop of a key of the keyboard assembly, the plurality of light-generating sources being configured to illuminate the key from underneath the keytop.

The subject matter of any one of the above examples, starting with and including Example 3, can optionally include a conductive trace deposited on the lightplate; and a power source, the conductive trace electrically linking the plurality of light-generating sources to the power source.

The subject matter of any one of the above examples, starting with an including Example 3, can optionally include at least two of the light-generating sources are underneath the keytop and are within a footprint of the keytop.

The subject matter of any one of the above examples, starting with and including Example 3, can optionally include the plurality of light-generating sources includes light-emitting semiconductors printed and/or sprayed onto the lightplate, while suspended in a liquid or gel medium.

The subject matter of any one of the above examples, starting with and including Example 3, can optionally include at least one other light-generating source deposited onto the lightplate that is not printed or sprayed onto the lightplate.

The subject matter of any one of the above examples, starting with and including Example 3, can optionally include the plurality of light-generating sources includes light-emitting semiconductors that each has a cross-section with a maximum length of 15 to 20 microns.

The subject matter of any one of the above examples, starting with and including Example 3, can optionally include the plurality of light-generating sources is deposited on the lightplate at a position that is substantially underneath a translucent key legend of the key, the plurality of light-generating sources configured to consistently illuminate the key legend of the key from underneath the keytop.

The subject matter of any one of the above examples, starting with and including Example 3, can optionally include the lightplate is positioned substantially underneath a key mechanism of the keyboard assembly, the key mechanism positioned underneath the keytop and configured to mechanically interact with the keytop, the plurality of light-generating sources being configured to illuminate the underside of the keytop.

The subject matter of Example 4 can optionally include a backlighting apparatus comprising a lightplate located within a keyboard assembly, the lightplate positioned underneath a keytop of a key of the keyboard assembly and above a backplate of the keyboard assembly; and a plurality of light-generating sources deposited on the lightplate at a position that is substantially underneath the keytop, the plurality of light-generating sources configured to consistently illuminate the key from underneath the keytop.

The subject matter of any one of the above examples, starting with and including Example 4, can optionally include a conductive trace deposited on the lightplate; and a power source, the conductive trace electrically linking the plurality of light-generating sources to the power source.

The subject matter of any one of the above examples, starting with and including Example 4, can optionally include the keyboard assembly comprises a plurality of keys, and wherein the plurality of light-generating sources are deposited on the lightplate at a plurality of positions that are substantially underneath a plurality of keytops of the plurality of keys and are configured to consistently illuminate the plurality of keys from underneath the plurality of keytops.

The subject matter of any one of the above examples, starting with and including Example 4, can optionally include the lightplate is positioned underneath a sensor layer of the keyboard assembly and above the backplate of the keyboard assembly.

The subject matter of any one of the above examples, starting with and including Example 4, can optionally include the lightplate is positioned underneath one or more keytops of the keyboard assembly and above a sensor layer of the keyboard assembly.

The subject matter of any one of the above examples, starting with and including Example 4, can optionally include the lightplate is positioned underneath one or more keytops of the keyboard assembly and above or within a key mechanics layer of the keyboard assembly.

The subject matter of any one of the above examples, starting with and including Example 4, can optionally include the lightplate is positioned within or underneath a key mechanics layer of the keyboard assembly and above the backplate of the keyboard assembly.

The subject matter of any one of the above examples, starting with and including Example 4, can optionally include the plurality of light-generating sources is deposited into multiple distinct groups of multiple light-generating sources and each group is placed substantially underneath the keytop.

The subject matter of any one of the above examples, starting with and including Example 4, can optionally include the plurality of light-generating sources includes light-emitting semiconductors that each has a cross-section with a maximum length of 15 to 20 microns.

The subject matter of Example 5 can optionally include depositing a plurality of light-generating sources on a lightplate within a keyboard assembly, the keyboard assembly including a plurality of keytops; positioning the lightplate underneath the plurality of keytops and above a backplate of the keyboard assembly, the plurality of light-generating sources disposed substantially underneath the plurality of keytops; and linking the plurality of light-generating sources via an electrically conductive trace to a power source, wherein the plurality of light-generating sources illuminate the plurality of keys from underneath the plurality of keys when the power supply supplies power to the electrically conductive trace.

The subject matter of any one of the above examples, starting with and including Example 5, can optionally include positioning the lightplate underneath the plurality of keytops such that a majority portion of the plurality of light-generating sources is disposed within a footprint of the plurality of keytops.

The subject matter of any one of the above examples, starting with and including Example 5, can optionally include printing and/or spraying a liquid or gel onto the lightplate, the liquid or gel having the plurality of light-generating sources suspended therein.

The subject matter of any one of the above examples, starting with and including Example 5, can optionally include replacing a pre-existing keyboard illumination source within the keyboard assembly with the lightplate to illuminate the plurality of keys of the keyboard.

The subject matter of any one of the above examples, starting with and including Example 5, can optionally include positioning the lightplate within the keyboard assembly to illuminate the plurality of keys of the keyboard without increasing a total thickness of the keyboard assembly as without the lightplate.

The subject matter of any one of the above examples, starting with and including Example 5, can optionally include the plurality of light-generating sources includes light-emitting semiconductors that each has a cross-section with a maximum length of 15 to 20 microns.

The subject matter of Example 6 can optionally include a keyboard assembly comprising: at least one key positioned on the keyboard assembly; a key mechanism positioned underneath a keytop of the key and configured to mechanically interact with the keytop, the key mechanism configured to provide a keypress function of the key; and a plurality of light-generating sources positioned substantially within or underneath the key mechanism, the plurality of light-generating sources being configured to illuminate the underside of the keytop with light emanating from the plurality of light-generating sources.

The subject matter of any one of the above examples, starting with and including Example 6, can optionally include a lightplate disposed substantially within or underneath the key mechanism, the plurality of light-generating sources printed and/or sprayed onto the lightplate.

The subject matter of any one of the above examples, starting with and including Example 6, can optionally include a conductive trace deposited onto the lightplate; and a power source, the conductive trace electrically linking the plurality of light-generating sources to the power source.

The subject matter of any one of the above examples, starting with and including Example 6, can optionally include a lightplate having one or more conductive traces electrically linking the plurality of light-generating sources to a power source, the lightplate having a light flap positioned on or within the key mechanism, the light flap having the plurality of light-generating sources thereon.

The subject matter of any one of the above examples, starting with and including Example 6, can optionally include the plurality of light-generating sources illuminates the underside of the keytop via light reflectively diffused by the key mechanism.

The subject matter of any one of the above examples, starting with and including Example 6, can optionally include the key mechanism comprises at least one of a resist-and-return structure and a key leveling structure.

The subject matter of any one of the above examples, starting with and including Example 6, can optionally include the plurality of light-generating sources includes a portion of light-generating sources comprising printed light-emitting semiconductors and includes at least one other light-generating source that is not a printed light-emitting semiconductor.

The subject matter of any one of the above examples, starting with and including Example 6, can optionally include at least two of the light-generating sources is underneath the keytop and within a footprint of the keytop.

The subject matter of Example 7 can optionally include a keyboard assembly comprising: a key positioned on the keyboard assembly; a key mechanism positioned underneath a keytop of the key and configured to mechanically interact with the keytop, the key mechanism configured to provide a keypress function of the key when the keytop is pressed; a lightplate positioned substantially within or underneath the key mechanism and above a backplate of the keyboard assembly, the lightplate including holes therein that allow for at least a portion of the key mechanism to pass therethrough when the keytop is pressed; and a plurality of light-generating sources deposited on the lightplate at a position that is substantially underneath the keytop, the plurality of light-generating sources configured to consistently illuminate the key from underneath the keytop.

The subject matter of any one of the above examples, starting with and including Example 7, can optionally include the key mechanism includes a key leveling structure comprising one or more rigid blades, and wherein at least a portion of the rigid blades passes through a hole in the lightplate when the keytop is pressed.

The subject matter of any one of the above examples, starting with and including Example 7, can optionally include the lightplate includes one or more conductive traces electrically linking the plurality of light-generating sources to a power source, the one or more conductive traces arranged between the holes of the lightplate.

The subject matter of any one of the above examples, starting with and including Example 7, can optionally include the lightplate includes a light flap positioned on or within the key mechanism, the light flap having the plurality of light-generating sources and/or one or more conductive traces thereon.

The subject matter of any one of the above examples, starting with and including Example 7, can optionally include the plurality of light-generating sources is deposited on the lightplate at positions between the holes that are substantially underneath a translucent key legend of the key, the plurality of light-generating sources configured to consistently illuminate the key legend of the key from underneath the keytop.

The subject matter of any one of the above examples, starting with and including Example 7, can optionally include the lightplate is positioned above a sensor layer of the keyboard assembly.

The subject matter of any one of the above examples, starting with and including Example 7, can optionally include the lightplate is positioned between a sensor layer of the keyboard assembly and the backplate.

The subject matter of Example 8 can optionally include a keyboard assembly comprising: a key layer including a key; a key mechanics layer including a keypress mechanism configured to mechanically interact with a keytop of the key and to provide a keypress of the key; a sensor layer including a sensor configured to detect the keypress of the key and to indicate the keypress to a keyboard controller; and a plurality of light-generating sources deposited on the key layer, the key mechanics layer, the sensor layer, or a combination thereof, and positioned substantially underneath the keytop, the plurality of light-generating sources being configured to illuminate the key from underneath the keytop.

The subject matter of any one of the above examples, starting with and including Example 8, can optionally include a conductive trace deposited on the key layer, the key mechanics layer, the sensor layer, or a backplate of the keyboard assembly, or a combination thereof; and a power source, the conductive trace electrically linking the plurality of light-generating sources to the power source.

The subject matter of any one of the above examples, starting with and including Example 8, can optionally include a backplate, and wherein at least a portion of the plurality of light-generating sources is deposited onto the backplate to illuminate the key and/or the keyboard assembly.

The subject matter of any one of the above examples, starting with and including Example 8, can optionally include the plurality of light-generating sources is deposited onto a topside and/or an underside of the keytop to illuminate the key.

The subject matter of any one of the above examples, starting with and including Example 8, can optionally include the plurality of light-generating sources is deposited onto the keypress mechanism to illuminate the key.

The subject matter of any one of the above examples, starting with and including Example 8, can optionally include the keypress mechanism comprises a resist-and-return structure and/or a leveling structure, and at least a portion of the plurality of light-generating sources is deposited onto the resist-and-return structure and/or the leveling structure to illuminate the key.

The subject matter of any one of the above examples, starting with and including Example 8, can optionally include the plurality of light-generating sources illuminates the key via light reflectively diffused by the keypress mechanism.

The subject matter of any one of the above examples, starting with and including Example 8, can optionally include the plurality of light-generating sources is printed and/or sprayed onto the sensor layer.

The subject matter of any one of the above examples, starting with and including Example 8, can optionally include the plurality of light-generating sources includes light-emitting semiconductors that each has a cross-section with a maximum length of 15 to 20 microns.

The subject matter of Example 9 can optionally include a method comprising: depositing a plurality of light-generating sources on a key layer, a key mechanics layer, or a sensor layer of a keyboard assembly, or a combination thereof, the keyboard assembly including a plurality of keytops; positioning the plurality of light-generating sources substantially underneath the plurality of keytops; and linking the plurality of light-generating sources via an electrically conductive trace to a power source, wherein the plurality of light-generating sources illuminate the plurality of keys from underneath the plurality of keytops when the power supply supplies power to the electrically conductive trace.

The subject matter of any one of the above examples, starting with and including Example 9, can optionally include depositing at least a portion of the plurality of light-generating sources onto a backplate of the keyboard assembly to illuminate the plurality of keys and/or the keyboard assembly.

The subject matter of any one of the above examples, starting with and including Example 9, can optionally include depositing the plurality of light-generating sources onto a topside and/or an underside of one or more of the plurality of keytops to illuminate the plurality of keys.

The subject matter of any one of the above examples, starting with and including Example 9, can optionally include depositing the plurality of light-generating sources onto the keypress mechanism to illuminate the plurality of keys.

The subject matter of any one of the above examples, starting with and including Example 9, can optionally include depositing the plurality of light-generating sources such that the plurality of light-generating sources illuminates the plurality of keys via light emanating from the plurality of light-generating sources and reflectively diffused by the keypress mechanism.

The subject matter of any one of the above examples, starting with and including Example 9, can optionally include depositing the plurality of light-generating sources and the electrically conductive trace onto the sensor layer to illuminate the plurality of keys.

The subject matter of any one of the above examples, starting with and including Example 9, can optionally include the depositing includes printing or spraying a liquid or gel onto the at least one of the key layer, the key mechanics layer, the sensor layer, or a combination thereof, the liquid or gel having the plurality of light-generating sources suspended therein.

The subject matter of Example 10 can optionally include a backlighting apparatus comprising: a multi-functional layer of a keyboard assembly; and a plurality of light-generating sources deposited onto or within the multi-functional layer of the keyboard assembly, the plurality of light-generating sources disposed substantially underneath a plurality of keytops of a plurality of keys of the keyboard assembly, and configured to consistently illuminate the plurality of keys from underneath the plurality of keytops.

The subject matter of any one of the above examples, starting with and including Example 10, can optionally include the multi-functional layer includes one or more of a plurality of keytops, a plurality of keypress mechanisms, or a plurality of keypress sensors.

The subject matter of any one of the above examples, starting with and including Example 10, can optionally include the multi-functional layer is positioned within the keyboard assembly above a backplate configured to support the keyboard assembly and to which one or more layers of the keyboard assembly is attached.

The subject matter of any one of the above examples, starting with and including Example 10, can optionally include one or more conductive traces disposed on the multi-functional layer and electrically linking the plurality of light-generating sources to a power source.

The subject matter of any one of the above examples, starting with and including Example 10, can optionally include the multi-functional layer comprises a key layer and includes the plurality of keytops, the plurality of light-generating sources being deposited onto an underside of the keytops to illuminate the plurality of keys.

The subject matter of any one of the above examples, starting with and including Example 10, can optionally include the multi-functional layer comprises a key mechanics layer and includes the plurality of keypress mechanisms, the keypress mechanisms each configured to mechanically interact with a keytop of the plurality of keytops and to provide a keypress action of the keytop.

The subject matter of any one of the above examples, starting with and including Example 10, can optionally include the multi-functional layer comprises a key mechanics layer and includes a plurality of resist-and-return structures and leveling structures configured to mechanically interact with the plurality of keytops and to provide a keypress action for the plurality of keytops, the plurality of light-generating sources deposited onto or within the resist-and-return structures and/or the leveling structures.

The subject matter of any one of the above examples, starting with and including Example 10, can optionally include the multi-functional layer comprises a sensor layer and includes a plurality of keypress sensors, the keypress sensors each configured to detect a keypress of a key of the plurality of keys and to indicate the keypress to a keyboard controller, the keypress sensors including at least one of a conductive keyswitch sensor, a capacitive sensor, or an electrically resistive sensor.

The subject matter of any one of the above examples, starting with and including Example 10, can optionally include the multi-functional layer is configured to replace a sensor layer of an existing keyboard assembly and to provide keypress detection and key illumination to the existing keyboard assembly.

The subject matter of Example 11 can optionally include a backlighting apparatus comprising: a lightplate comprised of a thin film; a plurality of light-generating sources deposited on the lightplate at a position that is substantially underneath an at least partially translucent key legend of a key of an assembled keyboard, the plurality of light-generating sources being configured to consistently illuminate the key legend of the key from underneath a keytop of the key.

The subject matter of any one of the above examples, starting with and including Example 11, can optionally include a conductive trace deposited on the lightplate; and
a power source, the conductive trace electrically linking the plurality of light-generating sources to the power source.

The subject matter of any one of the above examples, starting with and including Example 11, can optionally include the key legend includes a multi-letter word.

The subject matter of any one of the above examples, starting with and including Example 11, can optionally include the key legend has multiple symbols and the illumination of each symbol of the key legend by the plurality of light-generating sources is consistent in relationship with the illumination of the other symbols of the key legend.

The subject matter of any one of the above examples, starting with and including Example 11, can optionally include the key includes multiple translucent key legends, and wherein the plurality of light-generating sources is deposited on the lightplate in multiple groups that are substantially underneath the multiple translucent key legends of the key, the plurality of light-generating sources being configured to consistently illuminate the multiple translucent key legends of the key from underneath the keytop.

The subject matter of any one of the above examples, starting with and including Example 11, can optionally include a single group of the multiple groups of light-generating sources is separately addressable and separately controlled to illuminate a single translucent key legend of the multiple translucent key legends separately and individually.

The subject matter of any one of the above examples, starting with and including Example 11, can optionally include the single group of light-generating sources is separately controlled based on a keypress of one or more predetermined keys or key combinations.

The subject matter of any one of the above examples, starting with and including Example 11, can optionally include a light barrier surrounding a group of light-generating sources, the light barrier arranged to limit light from the group to illuminating a desired key legend of a desired key and to inhibit the light from leaking to other key legends or to other keys.

The subject matter of any one of the above examples, starting with and including Example 11, can optionally include the plurality of light-generating sources includes light-emitting semiconductors that includes light-emitting semiconductors that each has a cross-section with a maximum length of 15 to 20 microns.

The subject matter of Example 12 can optionally include a method comprising: depositing a plurality of light-generating sources on a lightplate within a keyboard assembly, the keyboard assembly including a key; positioning the lightplate underneath a keytop of the key, the plurality of light-generating sources disposed substantially underneath an at least partially translucent key legend of the key; and linking the plurality of light-generating sources via an electrically conductive trace to a power source, wherein the plurality of light-generating sources illuminate the key legend of the key from underneath the keytop when the power supply supplies power to the electrically conductive trace.

The subject matter of any one of the above examples, starting with and including Example 12, can optionally include spraying and/or printing a liquid or gel onto the lightplate, the liquid or gel having the plurality of light-generating sources suspended therein.

The subject matter of any one of the above examples, starting with and including Example 12, can optionally include positioning the lightplate so that the lightplate makes contact with an underside surface of the keytop.

The subject matter of any one of the above examples, starting with and including Example 12, can optionally include positioning the lightplate so that the key legend is illuminated by a first group of light-generating sources and the periphery of the key is illuminated by a second group of light-generating sources, either separately or simultaneously; and controlling the illumination of the first group and the second group independently.

The subject matter of any one of the above examples, starting with and including Example 12, can optionally include confining illumination of the plurality of light-generating sources to the key legend of the key and shielding the illumination of the plurality of light-generating sources from illuminating other legends and/or other keys.

The subject matter of Example 13 can optionally include a keyboard assembly comprising: a key layer including a key having a keytop; a lightplate located within the keyboard assembly, the lightplate positioned underneath the keytop and above a backplate of the keyboard assembly; a plurality of light-generating sources deposited on the lightplate at a position that is substantially underneath the keytop, the plurality of light-generating sources configured to consistently illuminate the key and/or the key legend from underneath the keytop; and one or more conductive traces disposed on the lightplate and electrically linking the plurality of light-generating sources to a power source.

The subject matter of any one of the above examples, starting with and including Example 13, can optionally include the lightplate includes a light flap positioned on, within, or underneath the keytop, the light flap having at least a portion of the plurality of light-generating sources thereon and a hinge physically connecting the light flap to the lightplate, the hinge extending one or more of the conductive traces of the lightplate to the plurality of light-generating sources of the flap so as to electrically couple the plurality of light-generating sources to a power source.

The subject matter of any one of the above examples, starting with and including Example 13, can optionally include multiple translucent key legends, and wherein the plurality of light-generating sources is deposited on the lightplate in multiple groups that are substantially underneath the multiple translucent key legends of the key, the multiple groups of light-generating sources being separately addressable and separately controlled to illuminate each of the translucent key legends of the multiple translucent key legends separately and individually based on a keypress of one or more predetermined keys or key combinations.

The subject matter of any one of the above examples, starting with and including Example 13, can optionally include a plurality of keys with translucent key legends, at least a portion of the keys having multiple translucent key legends, and wherein the light-generating sources are arranged to illuminate each of the plurality of keys and each of the translucent key legends, and are separately addressable and separately controlled to illuminate a single key and/or a single key legend.

The subject matter of any one of the above examples, starting with and including Example 13, can optionally include the separately addressable and separately controlled light-generating sources illuminate at least a portion of the plurality of keys and/or at least a portion of the translucent key legends according to a predetermined pattern, based on one or more preset triggers.

The subject matter of any one of the above examples, starting with and including Example 13, can optionally include the one or more triggers, with respect to a device including the keyboard assembly, includes: powering up the device, opening the device, receiving notification of a status of an application of the device, receiving a message or mail at the device, and having a limited selection of keystrokes available at the device.

The subject matter of any one of the above examples, starting with and including Example 13, can optionally include randomly illuminating or flashing a sequence of keys and/or key legends, rolling illumination of a sequence of adjacent keys and/or key legends, flashing a set of keys and/or key legends, dynamically illuminating or flashing a set or a sequence of keys and/or key legends according to audible tones, or temporarily illuminating one or more individual keys and/or key legends.

The subject matter of any one of the above examples, starting with and including Example 13, can optionally include the separately addressable and separately controlled light-generating sources illuminate a portion of the keys and/or the key legends when the portion represents a limited selection of acceptable keystrokes available to a user.

The invention claimed is:

1. A keyboard assembly comprising:
   a key including a keytop delineating a footprint of the key, the keytop having a translucent key legend aligned within the footprint;
   key mechanics that mechanically interact with a keypress of the key, the key mechanics being disposed vertically beneath the translucent key legend of the key and contained within the footprint of the key, and the key mechanics including at least one of a rubber dome or one or more blades of a scissor mechanism; and
   at least two groups of LEDs including a first group of LEDs and a second group of LEDs deposited vertically beneath the translucent key legend of the key and at least one of the first group of LEDs or the second group of LEDs being deposited directly on at least one of an outer surface of the rubber dome or a surface of the one or more blades of the scissor mechanism of the key mechanics within the footprint of the key, the at least two distinct groups of LEDs being configured to illuminate the translucent key legend of the key, and at least one of the first group of LEDs and the second group of LEDs s including a plurality of LEDs.

2. The keyboard assembly of claim 1, further comprising:
   a power source; and a conductive trace deposited directly on the key mechanics, the conductive trace electrically linking the at least two groups of LEDs to the power source.

3. The keyboard assembly of claim 1, wherein the key includes multiple translucent key legends, and wherein the at least two groups of LEDs are deposited underneath the multiple translucent key legends of the key, each of the at least two groups of LEDs being configured to illuminate at least one of the multiple translucent key legends of the key.

4. The keyboard assembly of claim 1, wherein at least one group of the at least two groups of LEDs is separately addressable and separately controllable to illuminate a single translucent key legend of the multiple translucent key legends separately and individually.

5. The keyboard assembly of claim 1, wherein the key mechanics further include at least one of a resist-and-return structure or a key leveling structure, and wherein at least one of the first group of LEDs or the second group of LEDs is deposited onto the at least one of the resist-and-return structure or the key leveling structure to illuminate the translucent legend of the at least one key.

6. The keyboard assembly of claim 1, wherein at least one of the first group of LEDs or the second group of LEDs illuminates the at least one key via light diffused by the key mechanics.

7. The keyboard assembly of claim 1, wherein the at least two groups of LEDs are printed or sprayed onto the key mechanics.

8. The keyboard assembly of claim 1, wherein each LED has a cross-section with a maximum length of 15 to 20 microns.

9. A method comprising:

integrating a plurality of keys into a keyboard assembly, each key including a keytop delineating a footprint of the key, and the keytop having a translucent key legend aligned within the footprint;

providing key mechanics for each key, the key mechanics mechanically interacting with a keypress of the respective key, the key mechanics being disposed vertically beneath the translucent key legend of the respective key and contained within the footprint of the respective key;

depositing an electrically conductive trace directly on the key mechanics;

depositing at least two distinct groups of LEDs directly on an outer surface of the key mechanics vertically beneath the translucent key legend within the footprint of the respective key, and at least one group of the at least two distinct groups of LEDs including a plurality of LEDs, wherein the key mechanics include at least one of a resist-and-return structure or a leveling structure; and linking the at least two distinct groups of LEDs via the electrically conductive trace to a power source, the at least two distinct groups of LEDs being configured to illuminate the translucent key legend of the respective key when a power supply supplies power to the electrically conductive trace.

10. The method of claim 9, wherein the depositing further includes depositing at least one group of the at least two distinct groups of LEDs such that the at least one group illuminates the respective key via light:

emanating from the at least two distinct groups of LEDs, and reflectively diffused by the key mechanics.

11. The method of claim 9, wherein the depositing includes printing or spraying a liquid or gel onto the key mechanics, the liquid or gel having the at least two distinct groups of LEDs suspended therein.

12. A backlighting apparatus for a keyboard, the backlighting apparatus comprising:

a key on a keyboard assembly, the key including a keytop delineating a footprint of the key, the keytop having a translucent key legend aligned within the footprint;

key mechanics that mechanically interact with a keypress of the key, the key mechanics being disposed vertically beneath the translucent key legend of the key and contained within the footprint of the key;

at least two distinct groups of LEDs deposited directly on a surface of the key mechanics, the at least two distinct groups of LEDs being deposited vertically beneath the translucent key legend of the key and within the footprint of the key and key mechanics, the at least two distinct groups of LEDs being configured to illuminate the key and/or the translucent key legend of the key, and at least one group of the at least two distinct groups of LEDs including a plurality of LEDs; and a conductive trace electrically linking the at least two distinct groups of LEDs.

13. The backlighting apparatus of claim 12, wherein the conductive trace electrically links the at least two distinct groups of LEDs to a power source.

14. The backlighting apparatus of claim 12, wherein the key mechanics include resist-and-return structures and leveling structures configured to mechanically interact with the keytop of the key and to provide the keypress of the key, the at least two distinct groups of LEDs being deposited onto or within the resist-and-return structures and/or the leveling structures.

15. The backlighting apparatus of claim 12, further comprising a sensor layer including keypress sensors, each keypress sensor being configured to detect the keypress of the at least one key of a plurality of keys to indicate the keypress to a keyboard controller, the keypress sensors including at least one of a conductive keyswitch sensor, a capacitive sensor, or an electrically resistive sensor.

16. The method of claim 9, further comprising providing a sensor layer configured to detect the keypress of the respective key.

17. The method of claim 9, wherein the depositing includes spraying or printing a liquid or gel onto the key mechanics, the liquid or gel having the at least two distinct groups of LEDs suspended therein.

18. The method of claim 9, wherein the key mechanics further include at least one of a rubber dome or a scissor mechanism.

19. The backlighting apparatus of claim 12, wherein the key mechanics include at least one of a rubber dome or one or more blades of a scissor mechanism.

* * * * *